(12) United States Patent
Han et al.

(10) Patent No.: US 12,461,376 B2
(45) Date of Patent: Nov. 4, 2025

(54) SEE-THROUGH TYPE DISPLAY APPARATUS AND ELECTRONIC DEVICE INCLUDING THE SAME

(71) Applicants: SAMSUNG ELECTRONICS CO., LTD., Suwon-si (KR); UNIVERSITY OF MASSACHUSETTS, Boston, MA (US)

(72) Inventors: Seunghoon Han, Seoul (KR); Amir Arbabi, Westfield, MA (US); Hyunsung Park, Suwon-si (KR)

(73) Assignees: SAMSUNG ELECTRONICS CO., LTD., Suwon-si (KR); UNIVERSITY OF MASSACHUSETTS, Boston, MA (US)

( * ) Notice: Subject to any disclaimer, the term of this patent is extended or adjusted under 35 U.S.C. 154(b) by 368 days.

(21) Appl. No.: 17/956,069

(22) Filed: Sep. 29, 2022

(65) Prior Publication Data

US 2023/0101762 A1   Mar. 30, 2023

Related U.S. Application Data

(60) Provisional application No. 63/250,506, filed on Sep. 30, 2021.

(30) Foreign Application Priority Data

Jun. 15, 2022   (KR) .................. 10-2022-0073056

(51) Int. Cl.
*G02B 27/01*     (2006.01)
*F21V 8/00*      (2006.01)
*G02B 1/00*      (2006.01)
*B60K 35/00*     (2024.01)

(52) U.S. Cl.
CPC ......... *G02B 27/0176* (2013.01); *G02B 1/007* (2013.01); *G02B 6/0035* (2013.01); *G02B 27/0172* (2013.01); *B60K 35/00* (2013.01); *G02B 2027/014* (2013.01); *G02B 2027/0152* (2013.01); *G02B 2027/0178* (2013.01)

(58) Field of Classification Search
None
See application file for complete search history.

(56) References Cited

U.S. PATENT DOCUMENTS

| 11,092,717 B2 | 8/2021 | Capasso et al. |
| 11,747,543 B1* | 9/2023 | Park ...................... F21S 43/239 362/606 |
| 2017/0131460 A1* | 5/2017 | Lin ...................... G02B 6/0026 |
| 2018/0024286 A1* | 1/2018 | Schubert ............ G02B 27/0172 362/553 |
| 2018/0356637 A1* | 12/2018 | Hu ....................... G02B 6/4471 |

(Continued)

*Primary Examiner* — Jerry Rahll
(74) *Attorney, Agent, or Firm* — Sughrue Mion, PLLC

(57) ABSTRACT

A see-through type display apparatus includes an image projector configured to output image light, a waveguide configured to receive the image light output from the image projector and transmit the image light to a user's view, and a first lens having a negative refractive power and a second lens having a positive refractive power, which are arranged on both surfaces of the waveguide. Each of the first lens and the second lens includes one or more meta lenses and is configured to operate as a lens with almost no chromatic aberration, thereby implementing a thin optical system having good image quality.

20 Claims, 19 Drawing Sheets

(56) References Cited

U.S. PATENT DOCUMENTS

| | | |
|---|---|---|
| 2019/0033683 A1* | 1/2019 | Ahmed .................. C23C 16/24 |
| 2019/0107719 A1 | 4/2019 | Edwin et al. |
| 2019/0129182 A1* | 5/2019 | Hu ......................... G06F 3/013 |
| 2019/0137762 A1* | 5/2019 | Hu ....................... G02B 27/144 |
| 2020/0284967 A1 | 9/2020 | Schowengerdt et al. |
| 2020/0285067 A1 | 9/2020 | Arbabi et al. |
| 2020/0393736 A1* | 12/2020 | Hu ....................... G02B 6/0011 |
| 2021/0044748 A1* | 2/2021 | Hu ...................... G02B 27/0172 |
| 2021/0063606 A1 | 3/2021 | Glik et al. |
| 2021/0096370 A1* | 4/2021 | Kress ................. G02B 27/0081 |
| 2021/0103072 A1* | 4/2021 | Nikolov ............. G02B 27/0172 |
| 2021/0263190 A1 | 8/2021 | Li et al. |
| 2021/0307608 A1* | 10/2021 | Hu ........................... A61B 3/14 |
| 2021/0356670 A1* | 11/2021 | Oh ....................... G02B 25/001 |
| 2022/0050308 A1* | 2/2022 | Lemoff .............. G02B 27/4205 |

* cited by examiner

SEE-THROUGH TYPE DISPLAY APPARATUS AND ELECTRONIC DEVICE INCLUDING THE SAME

CROSS-REFERENCE TO RELATED APPLICATIONS

This application claims the benefit of U.S. Provisional Application No. 63/250,506, filed on Sep. 30, 2021, in the US Patent Office and Korean Patent Application No. 10-2022-0073056, filed on Jun. 15, 2022, in the Korean Intellectual Property Office, the disclosures of which are incorporated by reference herein in their entireties.

BACKGROUND

1. Field

The disclosure relates to a see-through type display apparatus and an electronic device including the same.

2. Description of the Related Art

Recently, interest has grown in ultracompact display apparatuses that are to be used as wearable display devices for implementing virtual reality devices, augmented reality devices, and the like.

A solution to make ultracompact display apparatuses lighter and thinner while maintaining the quality of an image for the user's eyes has been continuously sought, and a light waveguide-based optical system has been used as an example thereof.

SUMMARY

Provided is a see-through type display apparatus having a thin and easy-to-wear structure.

Additional aspects will be set forth in part in the description which follows and, in part, will be apparent from the description, or may be learned by practice of the presented embodiments.

According to an aspect of the disclosure, a see-through type display apparatus may include an image projector configured to output image light, a waveguide configured to receive the image light output from the image projector and transmit the image light to a user's view, the waveguide including a first surface through which the image light is output and a second surface opposite the first surface, a first lens disposed on the first surface of the waveguide, the first lens having a negative refractive power, and including one or more meta lenses, and a second lens disposed on the second surface of the waveguide, the second lens having a positive refractive power.

The first lens may include a first meta lens disposed on the first surface of the waveguide, the first meta lens having a negative refractive power, a second meta lens spaced apart from the first meta lens by a first distance, the second meta lens having a positive refractive power, and a third meta lens spaced apart from the second meta lens by a second distance, the third meta lens having a negative refractive power.

The first lens may further include a first spacer disposed between the first meta lens and the second meta lens, the first spacer having a thickness corresponding to the first distance, and a second spacer disposed between the second meta lens and the third meta lens, the second spacer having a thickness corresponding to the second distance.

The first spacer and the second spacer may have the same refractive index and the same thickness.

The first lens may include a first meta lens disposed on the first surface of the waveguide, the first meta lens having a positive refractive power, a second meta lens spaced apart from the first meta lens by a first distance, the second meta lens having a negative refractive power, and a third meta lens disposed apart from the second meta lens by a second distance, the third meta lens having a positive refractive power.

One surface of the second lens may be a convex refractive lens.

The second lens may include one or more meta lenses.

The second lens may include a first meta lens having a positive refractive power, a second meta lens spaced apart from the first meta lens by a first distance, the second meta lens having a negative refractive power, and a third meta lens spaced apart from the second meta lens by a second distance, the third meta lens having a positive refractive power.

The second lens may further include a first spacer disposed between the first meta lens and the second meta lens, the first spacer having a thickness corresponding to the first distance, and a second spacer disposed between the second meta lens and the third meta lens, the second spacer having a thickness corresponding to the second distance.

The first spacer and the second spacer may have the same refractive index and the same thickness.

The first distance and the second distance may be $d_{min}$ or more, wherein $d_{min}$ may be represented by the equation below, where f may be a focal length of the second lens, D may be an effective diameter of the second lens, $n_g$ may be a refractive index of the first spacer and the second spacer, and $\theta_{max}$ may be a maximum deflection angle of incident light by the first meta lens:

$$d_{min} = \frac{\sqrt{f^2 + \frac{D^2}{4}} - f}{2n_g} \frac{\cos\theta_{max}}{1 - \cos\theta_{max}}.$$

The second lens may further include a blocking member configured to block light incident on the second lens from passing through a center of the second meta lens.

The blocking member may be disposed in a central portion of the first meta lens.

The blocking member may be disposed in a central portion of the second meta lens.

The blocking member may have a diameter of $Do_{min}$ or more, wherein $Do_{min}$ may be represented by the equation below, where f may be a focal length of the second lens, D may be an effective diameter of the second lens, $n_g$ may be a refractive index of the first spacer and the second spacer, and $\theta_{max}$ may be a maximum deflection angle of incident light by the first meta lens:

$$D_{o_{min}} = \frac{\sqrt{f^2 + \frac{D^2}{4}} - f}{n_g} \frac{\sin\theta_{max}}{1 - \cos\theta_{max}} = \frac{\sqrt{f^2 + \frac{D^2}{4}} - f}{n_g} \cot\frac{\theta_{max}}{2}.$$

An absolute value of the negative refractive power of the first lens may be different from an absolute value of the positive refractive power of the second lens.

The see-through type display apparatus may further include a vision correction lens detachably disposed adjacent to the first lens.

The vision correction lens may include a meta lens.

According to another aspect of the disclosure, an electronic device includes one of the see-through type display apparatus described above and a processor configured to control the see-through type display apparatus to output an additional image that a user views.

The see-through type display apparatus may include an eye-wearable device.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
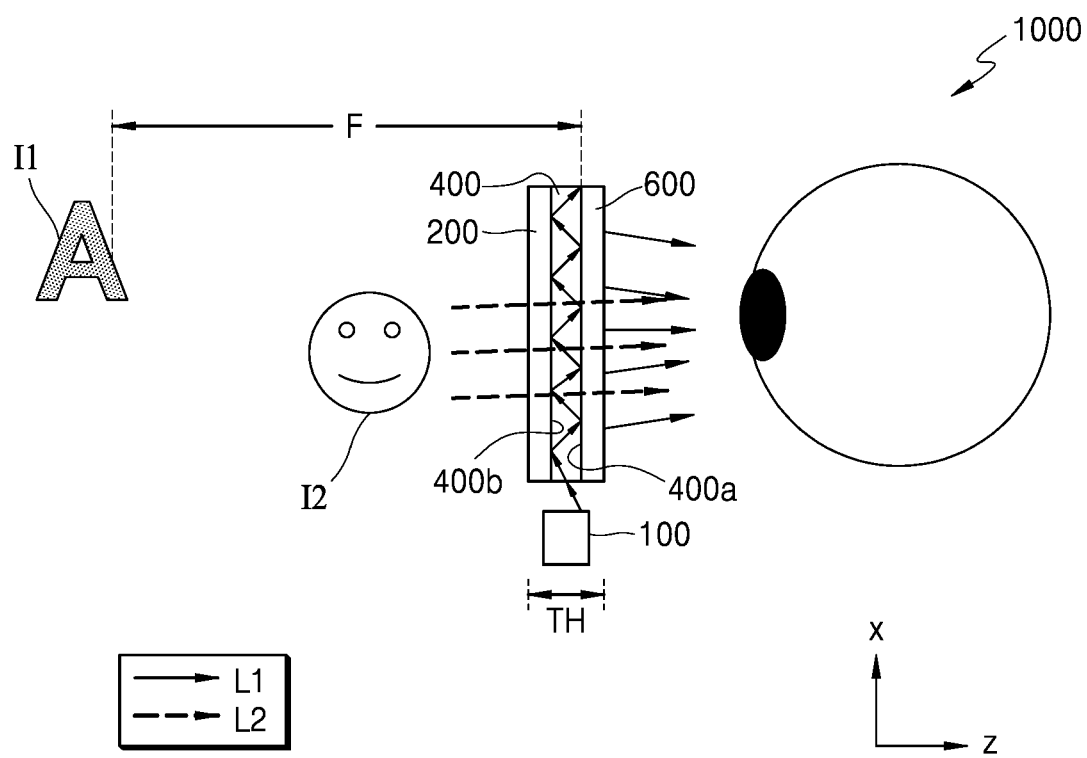
FIG. 1 is a schematic conceptual view showing a configuration of a see-through type display apparatus according to an embodiment.

Reference will now be made in detail to embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments are described below in detail with reference to the accompanying drawings. Furthermore, as embodiments described below are exemplary, other modifications may be produced from the embodiments. Throughout the drawings, like reference numerals denote like elements, and sizes of components in the drawings may be exaggerated for convenience of explanation and clarity.

Hereinbelow, when a constituent element is disposed "above" or "on" to another constituent element, the constituent element may be directly on the other constituent element or above the other constituent elements in a non-contact manner.

Terms such as "first" and "second" are used herein merely to describe a variety of constituent elements, but the constituent elements are not limited by the terms. Such terms are used only for the purpose of distinguishing one constituent element from another constituent element. The terms do not limit that the material or structure of the constituent elements are different from one another.

The expression of singularity in the specification includes the expression of plurality unless clearly specified otherwise in context. It will be further understood that the terms "comprises" and/or "comprising" used herein specify the presence of stated features or components, but do not preclude the presence or addition of one or more other features or components.

Furthermore, terms such as " . . . portion," " . . . unit," " . . . module," and " . . . block" stated in the specification may signify a unit to process at least one function or operation and the unit may be embodied by hardware, software, or a combination of hardware and software.

The use of the terms "a" and "an" and "the" and similar referents in the context of describing the disclosure are to be construed to cover both the singular and the plural.

Also, the steps of all methods described herein can be performed in any suitable order unless otherwise indicated herein or otherwise clearly contradicted by context. The disclosure is not limited to the described order of the steps. Furthermore, the use of any and all examples, or language (e.g., "such as") provided herein, is intended merely to better illuminate the disclosure and does not pose a limitation on the scope of the disclosure unless otherwise claimed.

FIG. 1 is a schematic conceptual view showing the configuration of a see-through type display apparatus 1000 according to an example embodiment.

Referring to FIG. 1, the see-through type display apparatus 1000 may include an image projector 100 for outputting image light L1, a waveguide 400 for transmitting the image light L1 to a user's view, a first lens 600 having a negative refractive power and arranged adjacent to a first surface 400a that is a light exit surface of the waveguide 400, and a second lens 200 having a positive refractive power and arranged adjacent to a second surface 400b facing the first surface 400a.

The see-through type display apparatus 1000 is an apparatus for combining the image light L1 from the image projector 100 with ambient light L2 containing the real environment in front of a user and providing combined light to the user. The user may view, on the see-through type display apparatus 1000, both of a first image 11 provided by the image projector 100 and a second image 12 that shows the real environment.

The waveguide 400 functions as an optical coupler for combining the image light L1 with the ambient light L2 and provides combined light to the user's eyes, is transparent to the ambient light L2 that is incident in a direction parallel to a first direction (Z direction) toward the user's view, and changes a path of the image light L1 that is incident in a direction different from the first direction to the direction parallel to the first direction (Z direction) to travel toward the user's view.

The image light L1 provided by the image projector 100 travels inside the waveguide 400 and is output through the first surface 400a, and passes through the first lens 600 to be transmitted to the user's view. In this case, the image light L1 is recognized by the user as the first image 11 from a certain virtual surface, that is for example, at a position of a focal length F of the first lens 600, by the first lens 600 having a negative refractive power.

The second lens 200 may have a positive refractive power in an amount to offset the negative refractive power of the first lens 600, such that the ambient light L2 containing the second image 12 that is the real environment in front of the user is transmitted to the user's view without the operation of refractive power.

Alternatively, the absolute value of the negative refractive power of the first lens 600 may be greater than the absolute value of the positive refractive power of the second lens 200. In this case, the first lens 600 may function as a lens to correct the vision of a near-sighted user.

Alternatively, the absolute value of the negative refractive power of the first lens 600 may be less than the absolute value of the positive refractive power of the second lens 200. In this case, the first lens 600 may function as a lens to correct the vision of a farsighted user In other words, the synthesized refractive power of the first lens 600 and the second lens 200 may be set to have a desired negative value or positive value suitable for the vision of a user.

In the see-through type display apparatus 1000 according to an embodiment, the first lens 600 and the second lens 200 may each include one or more meta lenses. A meta lens is capable of performing a refractive power operation by implementing a phase distribution for deflecting incident light by a different angle depending on a position using a plurality of nanostructures having the shape dimensions of a sub-wavelength. The sub-wavelength means a value smaller than the operating wavelength of the see-through type display apparatus 1000, that is for example, the central wavelength of a wavelength range of the image light L1 from the image projector 100. Light incident on a plurality of nanostructures having a refractive index difference from a peripheral material is phase-delayed while undergoing a refractive index distribution according to the shape and arrangement of nanostructures. A degree of phase-delay varies depending on the position of a refractive index distribution. Thus, the form of a wavefront connecting points having the same phase differs from the form before the incidence on the nanostructures, that is, the incident light is deflected. The meta lenses included in the first lens 600 and the second lens 200 may include a plurality of nanostructures having the shape and arrangement to implement a phase distribution suitable for a refractive power to be achieved by each lens. The term "phase" in the description means a relative phase, that is, a "phase delay," based on before experiencing the refractive index distribution formed by the nanostructures, at a position just after passing through nanostructures. The detailed structures of the first lens 600 as an example and the second lens 200, and the detailed structures of the meta lenses, as an example, included in the first lens 600 and the second lens 200 are described below.

The meta lens may have a very thin thickness, compared with a general refractive lens forming a refractive power by adjusting a curved surface shape, that is, a degree and lens shape of being concave or convex. Furthermore, detailed configurations may be set such that the meta lens operates as a lens with almost no chromatic aberration, that is for example, an almost achromatic lens.

Figure 2:
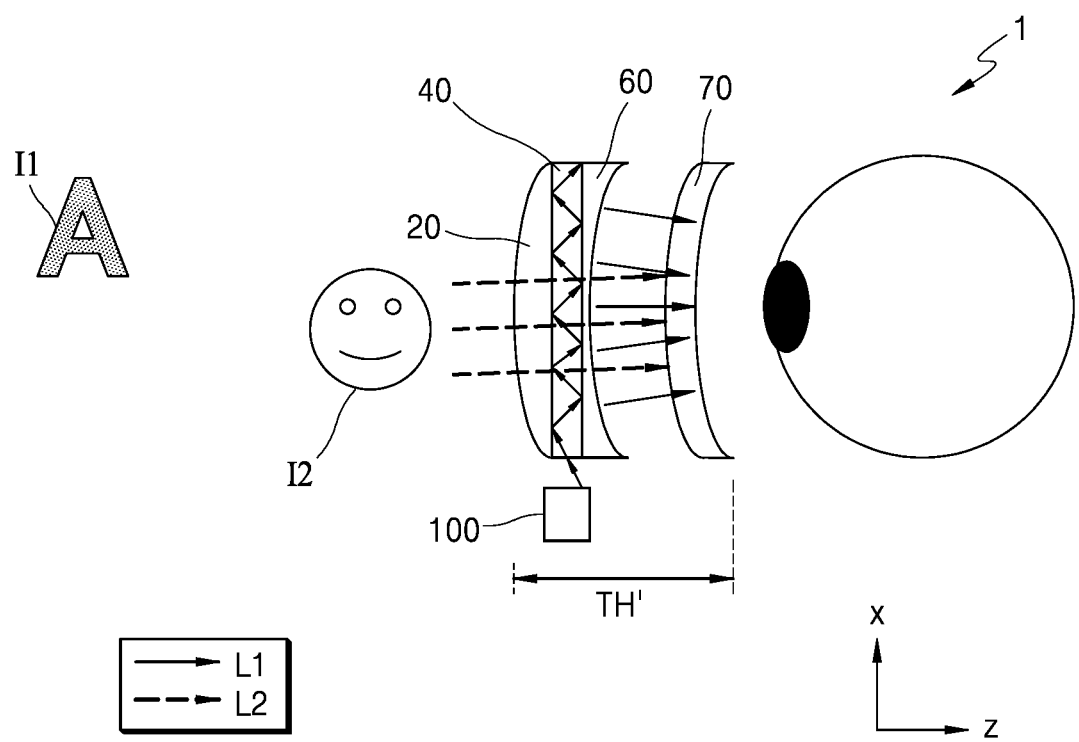
FIG. 2 is a schematic conceptual view showing a configuration of a see-through type display apparatus according to a comparative example.

For example, as shown in FIG. 2, the see-through type display apparatus 1 according to a comparative example may include the image projector 100, a waveguide 40, and a convex lens 20 and a concave lens 60 respectively arranged at both sides of the waveguide 40. The see-through type display apparatus 1 may further include a vision correction lens 70 having a curved surface on a path through which light coming from the concave lens 60 travels toward a user.

The greater the thicknesses of the concave lens 60, the convex lens 20, and the vision correction lens 70 of the see-through type display apparatus 1, which have a curved shape and form a refractive power, the greater the refractive power is. The resulting total thickness TH' may be several millimeters to several centimeters or more. When the see-through type display apparatus 1 is implemented, for example, as a glasses-type apparatus, the above thickness may be a factor that inconveniences wearing the glasses-type apparatus.

The see-through type display apparatus 1000 according to an embodiment includes the first lens 600 of a negative refractive power and the second lens 200 of a positive refractive power. The first lens 600 and second lens 200 do not employ a physically curved shape, and the first lens 600 functioning as a vision correction lens, may have a thinner total thickness TH. For example, the thickness TH may be about 8 mm or less.

Referring back to FIG. 1, the components of the see-through type display apparatus 1000 are described in detail.

The image projector 100 may include a display device for forming image light by modulating light according to image information to be displayed to a viewer, and one or more optical devices for transmitting the image light formed by the display device toward the waveguide 400.

The type of image formed by the display device of the image projector 100 is not particularly limited. The image may be, for example, a two-dimensional image or a three-dimensional image. The three-dimensional image may include, for example, a stereo image, a hologram image, a light field image, an integral photography (IP) image, or an image formed by a multi-view or a super multi-view method.

The display device may include, for example, a liquid crystal on silicon (LCoS) device, a liquid crystal display (LCD) device, an organic light-emitting diode (OLED) display device, and a digital micromirror device (DMD). The display device may also comprise next generation display devices, such as micro LEDs, quantum-dot (QD) LEDs, and the like. When a display device in the image projector 100 is of a non-light-emitting type, such as an LCD device, the image projector 100 may further include a light source that provides light for forming an image to the display device.

The image projector 100 may further include a path change member, a lens, or the like as an optical device for transmitting the image light L1 formed by the display device toward the waveguide 400. For example, a beam splitter for changing the path of the image light L1, a relay lens for magnifying or reducing the image light L1, a space filter for removing noise, and the like may be included. However, the disclosure is not limited thereto, and any known various optical systems may be used.

The waveguide 400 may include an optically transparent material, such as glass or a transparent plastic material having a refractive index greater than 1, as examples. The transparent material may mean a material through which the image light L1 formed in the image projector 100 passes, in which the material may not have a material transparency of 100%, and may have a certain color.

The waveguide 400 may include the first surface 400a and the second surface 400b facing each other. The image light L1 that is incident on the waveguide 400 travels inside the waveguide 400 and is totally reflected between the first surface 400a and the second surface 400b. The waveguide 400 may further include an input coupler for inputting the image light L1 at an angle by which the image light L1 is totally reflected inside the waveguide 400, and an output coupler for outputting the image light L1 by breaking the total reflection conditions inside the waveguide 400, and the image light L1 may be output by the output coupler through the first surface 400a. The input coupler and the output coupler may be formed at appropriate positions on the first surface 400a and the second surface 400b of the waveguide 400, and may be formed respectively on different surfaces, or may both be formed on the first surface 400a or the second surface 400b. In the drawings, although the image light L1 in the image projector 100 is illustrated as being incident on a side surface of the waveguide 400, this is for convenience only and the disclosure is not limited thereto.

Figure 3:
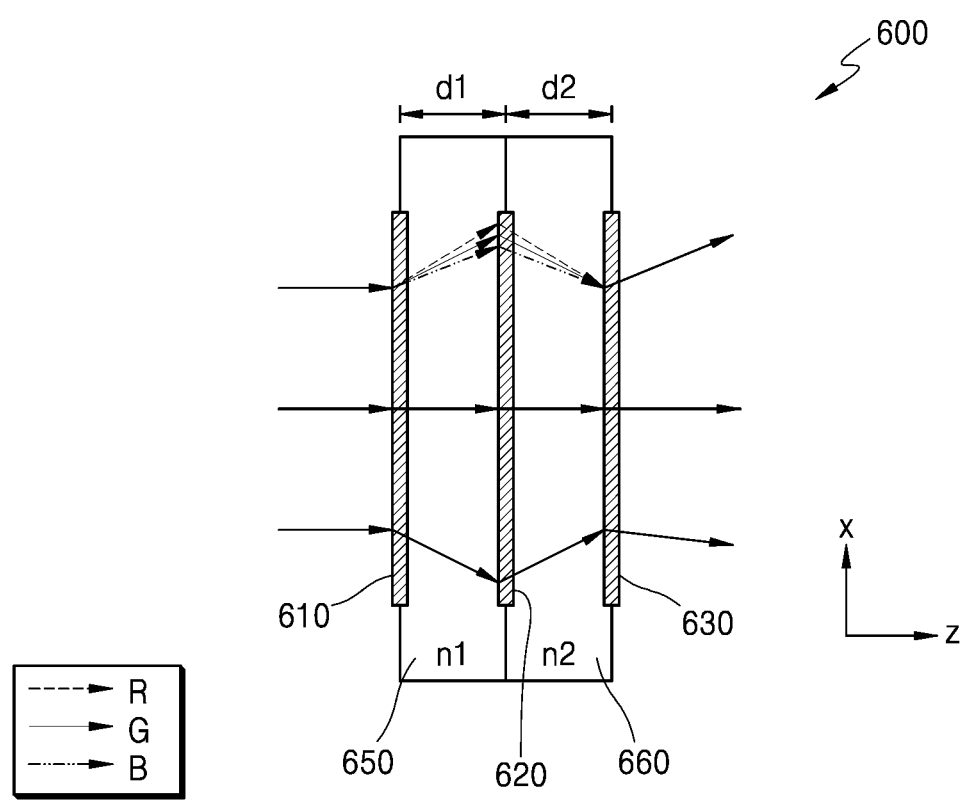
FIG. 3 is a schematic conceptual view showing a structure of a first lens in a see-through type display apparatus according to an embodiment, and an optical path having a negative refractive power with no chromatic aberration.
Figure 4:
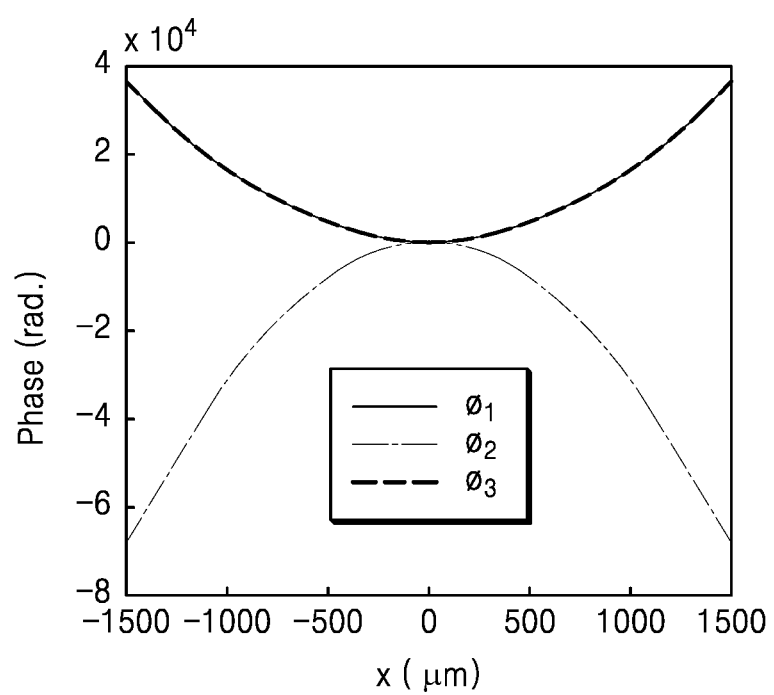
FIG. 4 is a graph showing an example of phase profiles of three meta lenses forming the first lens of FIG. 3.

FIG. 3 is a schematic conceptual view showing the structure of the first lens 600 in the see-through type display apparatus 1000 according to an embodiment, and an optical path having a negative refractive power with no chromatic aberration, and FIG. 4 is a graph showing an example of the phase profiles of three meta lenses forming the first lens 600 of FIG. 3

Referring to FIG. 3, the first lens 600 may include a first meta lens 610, a second meta lens 620, and a third meta lens 630. The first meta lens 610 and the second meta lens 620 may be spaced apart from each other by a distance d1, and the second meta lens 620 and the third meta lens 630 may be spaced apart from each other by a distance d2. A first spacer 650 having a thickness d1 and a refractive index n1 may be disposed between the first meta lens 610 and the second meta lens 620, and a second spacer 660 having a thickness d2 and a refractive index n2 may be disposed between the second meta lens 620 and the third meta lens 630. d1 may be the same as d2, and n1 may be the same as n2. However, the lens arrangement consistent with exemplary embodiments is not limited thereto.

The first lens 600 implements a negative refractive power with almost no chromatic aberration (achromatic) by using three meta lenses having chromatic aberration. In other words, the first meta lens 610, the second meta lens 620, and the third meta lens 630 have chromatic aberration, and have a negative refractive power, a positive refractive power, and a negative refractive power, respectively.

The chromatic aberration of a meta lens having a phase delay distribution formed by nanostructures is 0. In an example embodiment, $\partial \varphi / \partial \lambda$ is 0. The respective phase delays of $\varphi_1$, $\varphi_2$, and $\varphi_3$ by the first meta lens 610, the second meta lens 620, and the third meta lens 630 may have phase profiles according to locations, as shown in FIG. 4. The phase profiles have the same shape regardless of wavelengths or have shapes shifted by a constant between different wavelengths, that is, a dispersion of the phase delay distribution is 0. The light incident on a meta lens having chromatic aberration is deflected at a different angle according to a wavelength thereof and exits in a different direction. The chromatic aberration indicated by a meta lens is negative chromatic aberration in which a focal length is inversely proportional to a wavelength, and this tendency is opposite to positive chromatic aberration indicated by a general refractive lens in which a focal length is proportional to a wavelength.

The light incident on the first lens 600 passes through the first meta lens 610 and is deflected by the negative refractive power, and in this case, a degree of deflection varies depending on a wavelength. The light is split into red light R, green light G, and blue light B and travels in different directions. The longer the wavelength, the greater the deflection angle is. For example, the red light R has the greatest deflection angle, and then, the deflection angle decreases in the order of the green light G and the blue light B. The light split as above passes through the second meta lens 620 and affected by a positive refractive power operation, and then, passes through the third meta lens 630 and affected by a negative refractive power operation. When the red light R passes through the second meta lens 620, the deflection angle of the red light R is the greatest, and then, the deflection angle decreases in the order of the green light G and the blue light B, and after being incident on the third meta lens 630 at different incident angles, and passing through the third meta lens 630, the red light R, the green light G, and the blue light B travel in the same direction.

Details of the configuration of the first lens 600 of a negative refractive power with no chromatic aberration, which are described with reference to FIGS. 3 and 4, may be represented by the following equations.

$$f_2 = \frac{F}{1 - \sqrt{1 - \frac{2n_g F}{d}}} \qquad \text{[Equation 1]}$$

$$f_1 = -2f_2 + \frac{2d}{n_g}$$

$$f_3 = -2f_2 + \frac{d}{n_g}\left(2 - \frac{d}{n_g f_2}\right)$$

Here, $f_1$, $f_2$, and $f_3$ denote focal lengths of the first meta lens 610, the second meta lens 620, and the third meta lens 630, respectively, in which d1=d2=d and n1=n2=$n_g$. F denotes the focal length of the first lens 600.

$$\phi_m = \frac{\pi}{\lambda_0 f_m} r^2 \text{ for } m = 1, 2, 3. \quad \text{[Equation 2]}$$

$\varphi_1$, $\varphi_2$, and $\varphi_3$ denote phase delays by the first meta lens 610, the second meta lens 620, the third meta lens 630, respectively, and $\lambda_0$ denotes the central wavelength of an operating wavelength band of the first lens 600. For each m(1, 2, 3), r denotes a radial distance from a center of the first meta lens 610, second meta lens 620, third meta lens 630.

$f_1$, $f_2$, and $f_3$ may be determined from the above equations according to a desired F value.

For example, in a case in which F=−1 m, d=1 mm, and $n_g$=1.46, $f_1$=−36.33 mm, $f_2$=18.85 mm, and $f_3$=−36.33 mm, or, $f_1$=37.70 mm, $f_2$=−18.17 mm, and $f_3$=37.73 mm.

As such, it may be seen that a negative refractive power with no chromatic aberration is implemented by a refractive power combination different from FIG. 3.

Figure 5:
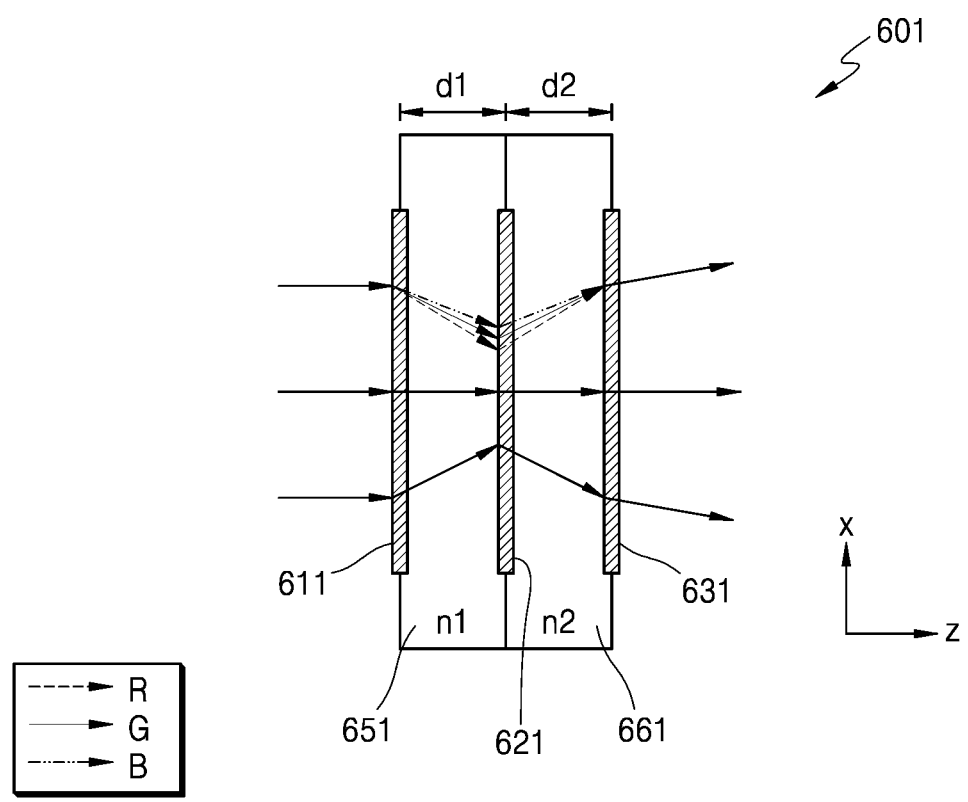
FIG. 5 is a schematic conceptual view showing a structure of another example of a first lens in a see-through type display apparatus according to an embodiment, and an optical path having a negative refractive power with no chromatic aberration.

FIG. 5 is a schematic conceptual view showing the structure of another example of a first lens 601 in a see-through type display apparatus according to an embodiment, and an optical path having a negative refractive power with no chromatic aberration.

Referring to FIG. 5, the first lens 601 may have a first meta lens 611, a second meta lens 621, and a third meta lens 631 respectively having chromatic aberrations, and the first meta lens 611, the second meta lens 621, and the third meta lens 631 may have a positive refractive power, a negative refractive power, and a positive refractive power, respectively. The first meta lens 611 and the second meta lens 621 may be spaced apart from each other by a distance d1, and the second meta lens 621 and the third meta lens 631 may be spaced apart from each other by a distance d2. A first spacer 651 having a thickness d1 and a refractive index n1 may be disposed between the first meta lens 611 and the second meta lens 621, and a second spacer 661 having a thickness d2 and a refractive index n2 may be disposed between the second meta lens 621 and the third meta lens 631. d1 may be the same as d2, and n1 may be the same as n2. However, an embodiment consistent with the disclosure is not limited thereto.

The first lens 601 of FIG. 5 is different from the first lens 600 of FIG. 3 in the refractive power of each of the first meta lens 611, the second meta lens 621, and the third meta lens 631, and due to the above configuration, the first lens 601 exhibits a negative refractive power with almost no chromatic aberration, similar to the first lens 600 of FIG. 3.

The light incident on the first lens 601 passes through the first meta lens 611 and is deflected by a positive refractive power, and in this case, as a degree of deflection varies depending on a wavelength, the light is split into the red light R, the green light G, and the blue light B and travels in different directions. The longer the wavelength, the greater the deflection angle is, that is, the red light R has the greatest deflection angle, and then the deflection angle decreases in the order of the green light G and the blue light B. The lights split as above pass through the second meta lens 621 and affected by a negative refractive power operation, and then pass through the third meta lens 631 and affected by a positive refractive power operation. When passing through the second meta lens 621, the red light R has the greatest amount of deflection angle, and the deflection angle decreases in the order of the green light G and the blue light B. After being incident on the third meta lens 631 at different incident angles, and passing through the third meta lens 631, the red light R, the green light G, and the blue light B travel in the same direction.

Figure 6:
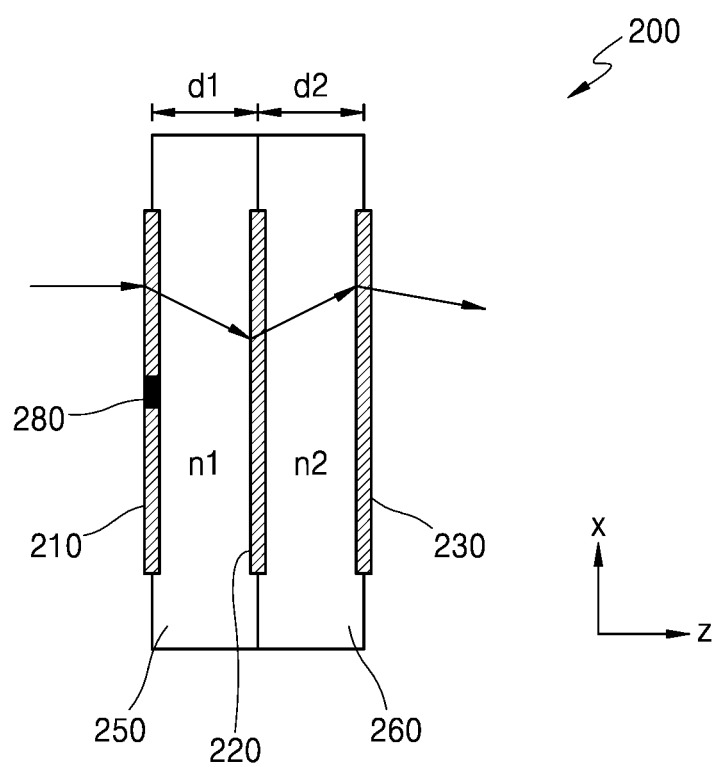
FIG. 6 is a schematic conceptual view showing a structure of a second lens in a see-through type display apparatus according to an embodiment.
Figure 7:
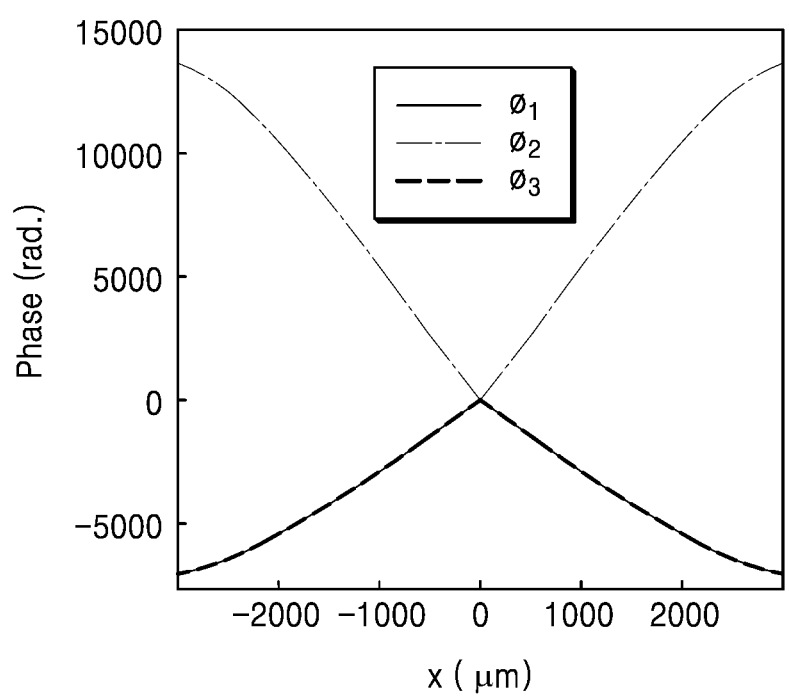
FIG. 7 is a graph showing an example of phase profiles of three meta lenses forming the second lens of FIG. 6.

FIG. 6 is a schematic conceptual view showing the structure of the second lens 200 in a see-through type display apparatus according to an embodiment. FIG. 7 is a graph showing an example of the phase profiles of three meta lenses forming the second lens 200 of FIG. 6.

The second lens 200 is a lens having a positive refractive power with almost no chromatic aberration. The second lens 200 may include a first meta lens 210, a second meta lens 220, and a third meta lens 230. The first meta lens 210, the second meta lens 220, and the third meta lens 230 may have a positive refractive power, a negative refractive power, and a positive refractive power, respectively. The first meta lens 210 and the second meta lens 220 may be spaced apart from each other by a distance d1, and the second meta lens 220 and the third meta lens 230 may be spaced apart from each other by a distance d2. A first spacer 250 having a thickness d1 and a refractive index n1 may be disposed between the first meta lens 210 and the second meta lens 220, and a second spacer 230 having a thickness d2 and a refractive index n2 may be disposed between the second meta lens 220 and the third meta lens 230. d1 may be the same as d2, and n1 may be the same as n2. However, the disclosure is not limited thereto.

The second lens 200 may further include a blocking member 280. The position of the blocking member 280 is not particularly limited so long as the light incident on the second lens 200 is prevented from passing through the central portion of the second meta lens 220. The blocking member 280 may block the light incident on the second lens 200 from passing through the central portions of the first meta lens 210, the second meta lens 220, and the third meta lens 230. The blocking member 280 is arranged because, as shown in FIG. 7, there is a singular point at which the sign and amount of a refractive power sharply change at the centers of the first meta lens 210, the second meta lens 220, and the third meta lens 230, which may break a continuous achromatic aberration optical path condition and generate scattered light noise. As illustrated in the drawings, the blocking member 280 may be disposed in the central portion of the first meta lens 210.

The phase profiles of the first meta lens 210, the second meta lens 220, and the third meta lens 230 may be set such that the second lens 200 has a positive refractive power with almost no chromatic aberration.

The chromatic aberration of the second lens 200 depends on the phase delay distribution, that is, dΦ/dλ, of the second lens 200, and a certain condition of a phase delay distribution profile is satisfied to have achromatic properties.

For example, when the phases of the first meta lens 210 and the third meta lens 230 are φ(r), the phase of the second meta lens 220 is $\varphi_m$, and the phase of the second lens 200 is Φ(r, λ), the following equation may be satisfied.

$$\frac{d\phi}{dr} = \pm n k_0 \sqrt{1 - \left(\frac{2 n_g k_0 d}{\lambda \frac{d\Phi}{d\lambda}}\right)^2} \quad \text{[Equation 3]}$$

Here, d=d1=d2, $n_g$=n1=n2, and $k_0$=2π/Ao. $\lambda_0$ denotes the central wavelength of an operating wavelength band.

As a solution of the above equation, the phase delay profiles of $\varphi_1$, $\varphi_2$, and $\varphi_3$ by the first meta lens 210, the second meta lens 220, and the third meta lens 230 shown in FIG. 7 may be obtained.

When the effective diameter of the second lens 200 is D, the focal length of the second lens 200 is f, and the maximum phase delay distribution $\Delta(d\Phi/d\lambda)$ is assumed as follows, $$\Delta \frac{d\Phi}{d\lambda} = k_0 \left( \sqrt{f^2 + \frac{D^2}{4}} - f \right) / \lambda \qquad \text{[Equation 4]}$$

A thickness minimum value $d_{min}$ of the first spacer 250 and a second spacer 260 is as follows.

$$d_{min} = \frac{\sqrt{f^2 + \frac{D^2}{4}} - f}{2n_g} \frac{\cos\theta_{max}}{1 - \cos\theta_{max}} \qquad \text{[Equation 5]}$$

A minimum diameter $Do_{min}$ of the blocking member 280 is as follows.

$$Do_{min} = 2d_{min} \tan \theta_{max} \qquad \text{[Equation 6]}$$

$Do_{min}$ may be represented as follows.

$$D_{o_{min}} = \frac{\sqrt{f^2 + \frac{D^2}{4}} - f}{n_g} \frac{\sin\theta_{max}}{1 - \cos\theta_{max}} = \frac{\sqrt{f^2 + \frac{D^2}{4}} - f}{n_g} \cot\frac{\theta_{max}}{2} \qquad \text{[Equation 7]}$$

Here, D denotes the effective diameter of the second lens 200, f denotes the focal length of the second lens 200, and $\theta_{max}$ denotes the maximum deflection angle of the first meta lens 210 of the incident light.

Assuming that $\theta_{max}$ is 45 degrees, $Do_{min}$ is as follows $$D_{o_{min}} = 2.4 \frac{\sqrt{f^2 + \frac{D^2}{4}} - f}{n_g} \qquad \text{[Equation 8]}$$

For example, when D=1 cm, f=5 cm, and $n_g$=1.45, $Do_{min}$ is 0.4 mm, and $d_{min}$=1.2 mm.

Figure 8:
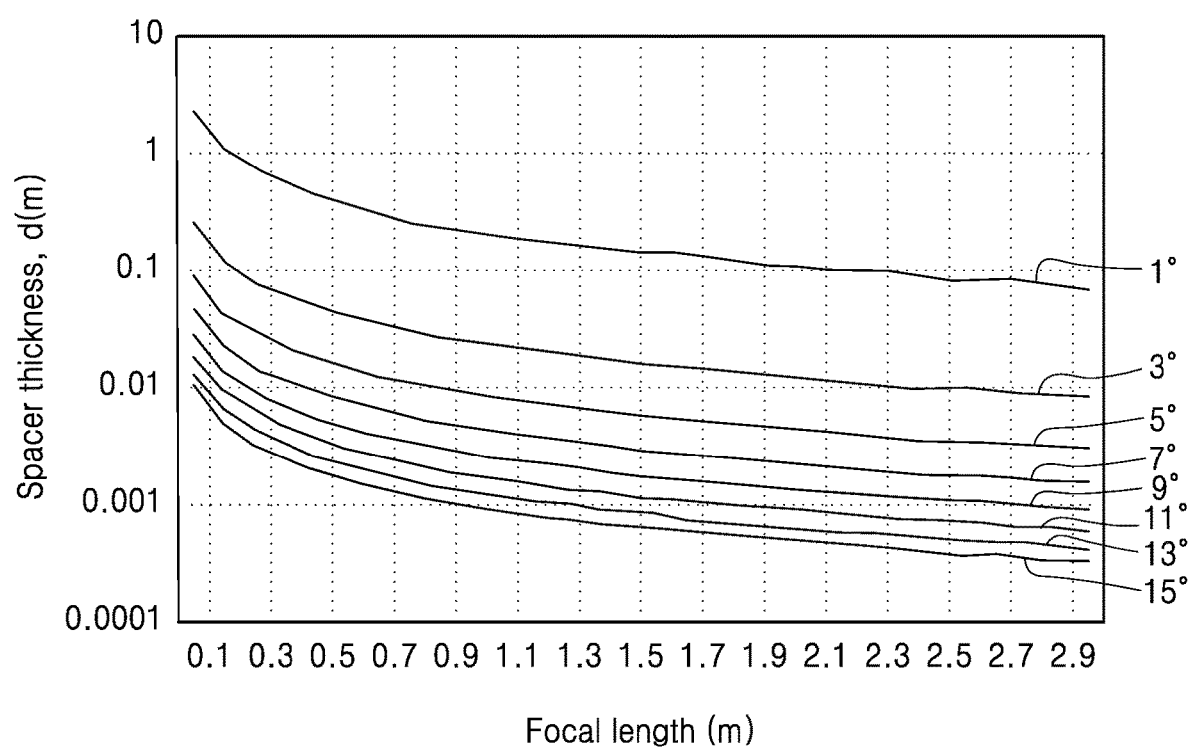
FIG. 8 is a graph showing a relation between the thickness and the focal length of a spacer, with respect to various maximum deflection angles by a first meta lens in the second lens of FIG. 6.

FIG. 8 is a graph showing a relation between the thickness and the focal length of a spacer, with respect to various maximum deflection angles by a first meta lens in the second lens 200 of FIG. 6.

The graphs show, as a case assuming that d1=d2=d, the relation of the thickness d and a focal length with respect to the $\theta_{max}$ value from 1° to 15°. As the maximum focal length to be implemented is limited according to a given $\theta_{max}$, a meaningful minimum value of the thickness d may be set from the graph.

Figure 9:
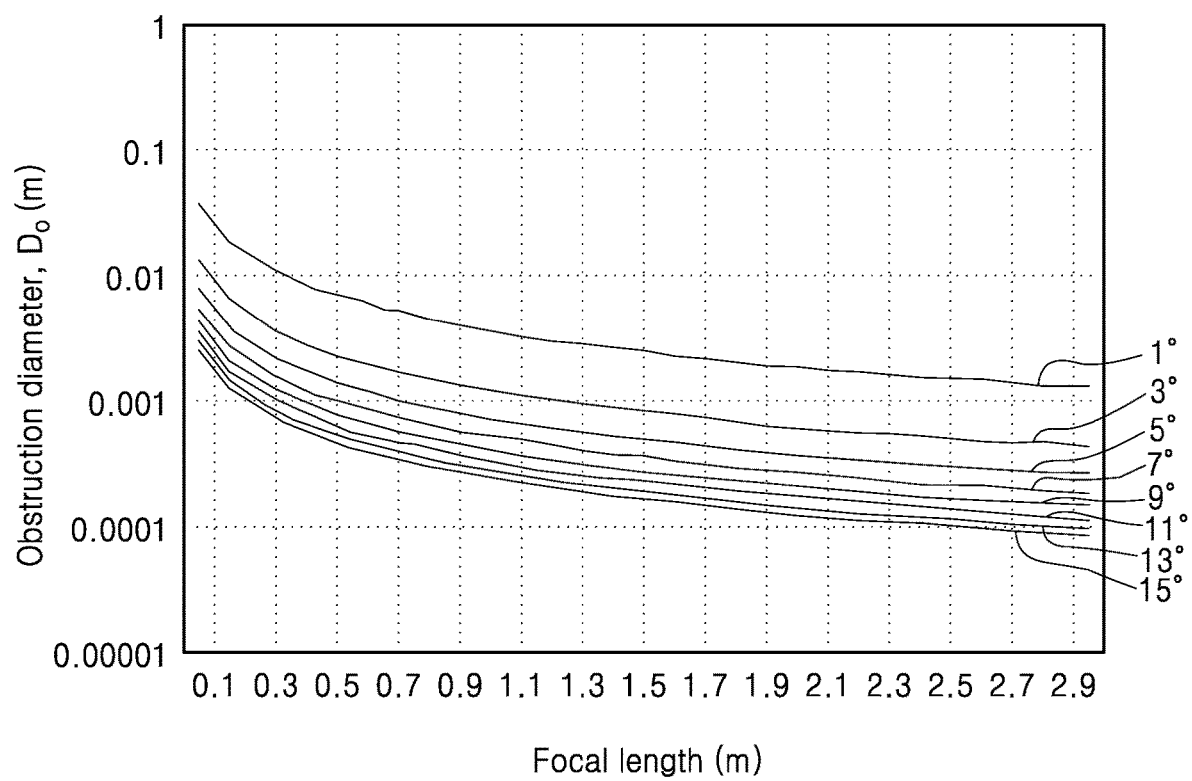
FIG. 9 is a graph showing a relation between the diameter and the focal length of a blocking member, with respect to various maximum deflection angles by the first meta lens in the second lens of FIG. 6.

FIG. 9 is a graph showing a relation between the diameter and the focal length of the blocking member, with respect to various maximum deflection angles by a first meta lens in the second lens 200 of FIG. 6.

The graphs show, as a case assuming that d1=d2=d, the relation of a focal length and a diameter Do of the blocking member with respect to the $\theta_{max}$ value from 1° to 15°. As the maximum focal length to be implemented is limited according to a given $\theta_{max}$, a meaningful minimum value of the diameter $D_0$ may be set from the graph.

Figure 10:
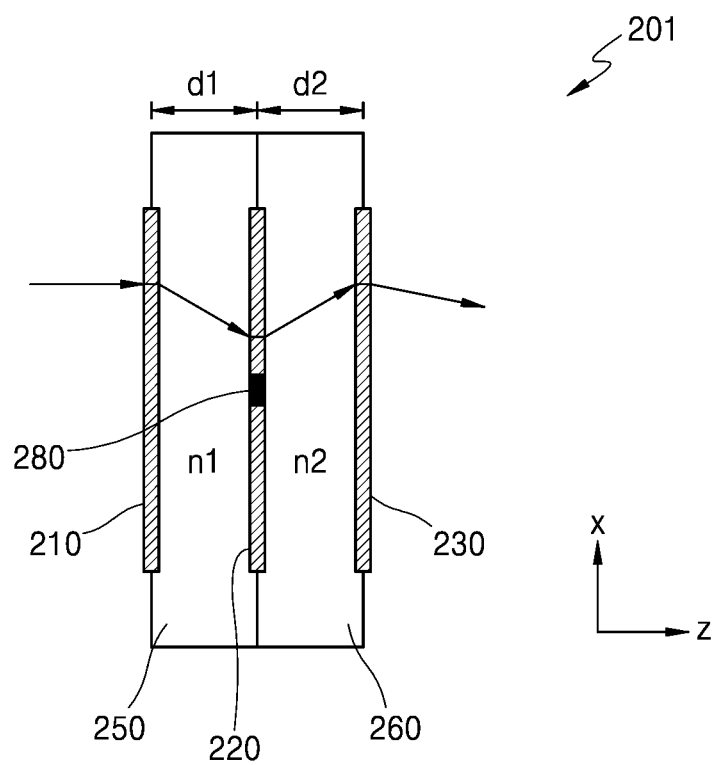
FIG. 10 is a schematic conceptual view showing a structure of another example of a second lens in a see-through type display apparatus according to an embodiment.

FIG. 10 is a schematic conceptual view showing the structure of another example of a second lens 201 in a see-through type display apparatus according to an embodiment.

In the present embodiment, the second lens 201 is different from the second lens 200 of FIG. 6 in the position of the blocking member 280, and the rest of the configuration is substantially the same as the second lens 200 of FIG. 6. As illustrated in the drawings, the blocking member 280 may be disposed in the central portion of the second meta lens 220.

The minimum thickness $d_{min}$ of the first spacer 250 and the second spacer 260 and the minimum diameter $Do_{min}$ of the blocking member 280 may satisfy the above equations.

As described above, each of the meta lenses forming the first lens 600 (601) and the second lens 200 (201) provided in the see-through type display apparatus 1000, that is for example, the first meta lens 610 (611), the second meta lens 620 (621), and the third meta lens 630 (631) of the first lens 600 (601), and the first meta lens 210, the second meta lens 220, and the third meta lens 230 of the second lens 200, has a structure to implement a certain phase profile, and an example structure thereof is described below.

Figure 11:
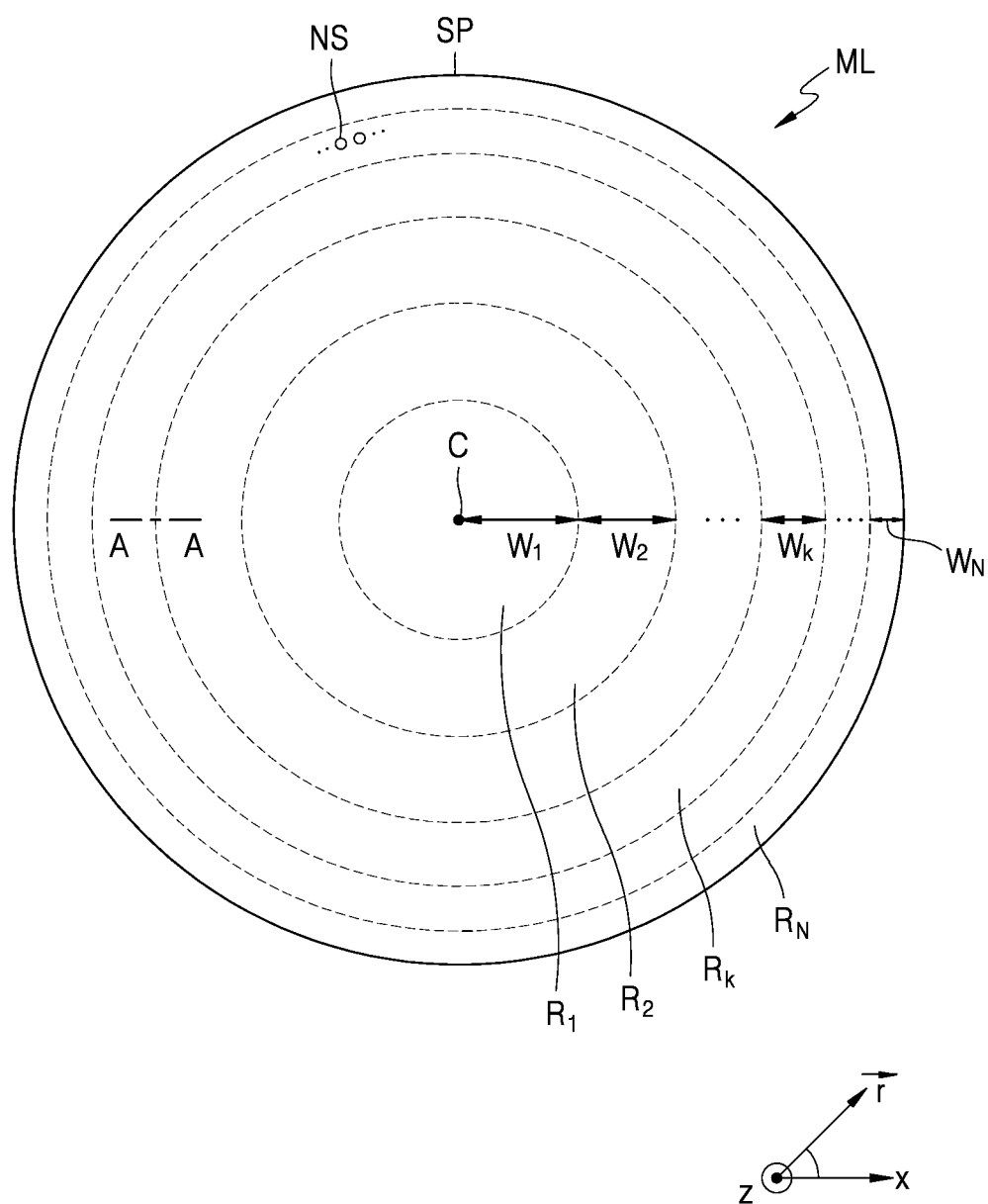
FIG. 11 is a schematic plan view showing a structure of a meta lens in a see-through type display apparatus according to an embodiment.

FIG. 11 is a schematic plan view showing the structure of a meta lens ML in a see-through type display apparatus according to an embodiment.

The meta lens ML may include a plurality of nanostructures NS to show a certain phase delay profile with respect to incident light. The nanostructures NS may be disposed on a support layer SP. The support layer SP may be any one of the spacers shown in FIGS. 3, 5, 6, and 10. The nanostructure NS may have a shape dimension less than the central wavelength $\lambda_0$ of the operating wavelength band. The nanostructure NS may have a shape dimension of a sub-wavelength less than the minimum wavelength $\lambda_m$ of the operating wavelength band. The operating wavelength band may be a visible light band. The nanostructure NS has a refractive index different from a refractive index of the support layer SP or other peripheral materials. The meta lens ML may implement various phase profiles with respect to the incident light according to the arrangement of the nanostructure NS, and as described above, may be used as the first meta lens 610 (611), the second meta lens 620 (621), and the third meta lens 630 (631) of the first lens 600 (601), and the first meta lens 210, the second meta lens 220, and the third meta lens 230 of the second lens 200.

The meta lens ML may include a plurality of phase modulation regions $R_k$ including the nanostructures NS of which the shape, size, and arrangement form are determined according to a set rule. Although FIG. 11 illustrates, for convenience, as an example only a few nanostructure NS, the nanostructures NS are arranged for each of the phase modulation regions $R_k$.

The phase modulation regions $R_k$ may be arranged in a certain direction defining a phase profile, and the direction may be, as illustrated in the drawings, a radial direction r away from a center C of the meta lens ML. However, the disclosure is not limited thereto.

The rule set for each region of the meta lens ML is applied to parameters, such as the shape, size (width, height), interval, arrangement form, and the like of the nanostructure NS, and may be set according to the phase profile that the meta lens ML intends to implement as a whole, for example, the phase profile illustrated in FIG. 4 or 7.

When light is incident on the meta lens ML in a Z direction and passes through the meta lens ML, the light meets a refractive index distribution according to the arrangement of the nanostructures NS having a refractive index different from that of a peripheral material. The position of a wavefront connecting points having the same phase on a light traveling path is different before and after undergoing the refractive index distribution according to the arrangement of the nanostructure NS, which is represented as a phase delay. A degree of phase delay differs depending on the position (x, y coordinates) on a surface perpendicular to the light traveling direction (Z direction) at a position just after the light passes through the nanostructures NS of the meta lens ML, and forms a transmission phase profile of the meta lens ML. When the transmission phase profile has a polar-symmetry or a rotational symmetry of a certain angle with respect to a Z-axis passing through the center C of the meta lens ML, the phase profile may be represented as a function of a distance r from the center C. The detailed shape, size, arrangement, and the like of the nanostructure NS may be determined for each position according to the desired phase profile.

The phase modulation regions $R_k$ each indicate a phase modulation pattern in a certain range. The phase modulation regions $R_k$ may include a first region $R_1$, a second region $R_2$, ..., and an N-th region $R_N$, which are sequentially arranged from the center C of the meta lens ML in the radial direction r. As illustrated in the drawings, the first region $R_1$ may be circular, and the second region $R_2$ to the N-th region $R_N$ may be annular. The first region $R_1$ to the N-th region $R_N$ are areas indicating a phase delay of a certain range, for example, a phase delay of $2\pi$ radians. Although the above area classification is not indicated on the horizontal axis of the phase profile graphs of FIGS. 4 and 7, it may be seen that an area in which, from the center of the horizontal axis, a phase range of a vertical axis corresponding thereto is $2\pi$ radians corresponds to the same phase modulation region.

The total number N of phase modulation regions, the width ($W_1$, ... $W_k$, ... $W_N$) of each region, and a phase profile in each region may be main variables in the performance of the meta lens ML.

For the meta lens ML to function as a lens having a refractive power, the width of each of the phase modulation regions $R_k$ may be set to be irregular, for example, to decrease or increase from the center C toward a peripheral portion. Two phase modulation regions $R_k$ and $R_{k+1}$ that are adjacent to each other are areas indicating the same phase modulation range, and as the widths of the two phase modulation regions $R_k$ and $R_{k+1}$ in the radial direction r are different from each other, inclinations of a phase change according to the radial direction are different from each other, and the inclination may be changed in each region. Accordingly, when the incident light passes through each position of the meta lens ML, the light may deflect at different angles between the respective regions and within one region. As such, the incident light is affected by a refractive power operation of converging or diverging after passing through the meta lens ML.

The number of phase modulation regions $R_k$ and the distribution of widths are related to the amount (absolute value) of the effective diameter and refractive power of the meta lens ML, and the sign of refractive power may be determined according to the rule in the phase modulation regions $R_k$. For example, as the refractive power increases, the phase modulation regions $R_k$ having a narrower width may be used more, and in each of the phase modulation regions $R_k$, the positive refractive power may be implemented by the arrangement (phase decreasing arrangement) of a rule by which the size of the nanostructure NS decreases in the radial direction, and the negative refractive power may be implemented by the arrangement (phase increasing arrangement) of a rule by which the size of the nanostructure NS increases in the radial direction.

Figure 12:
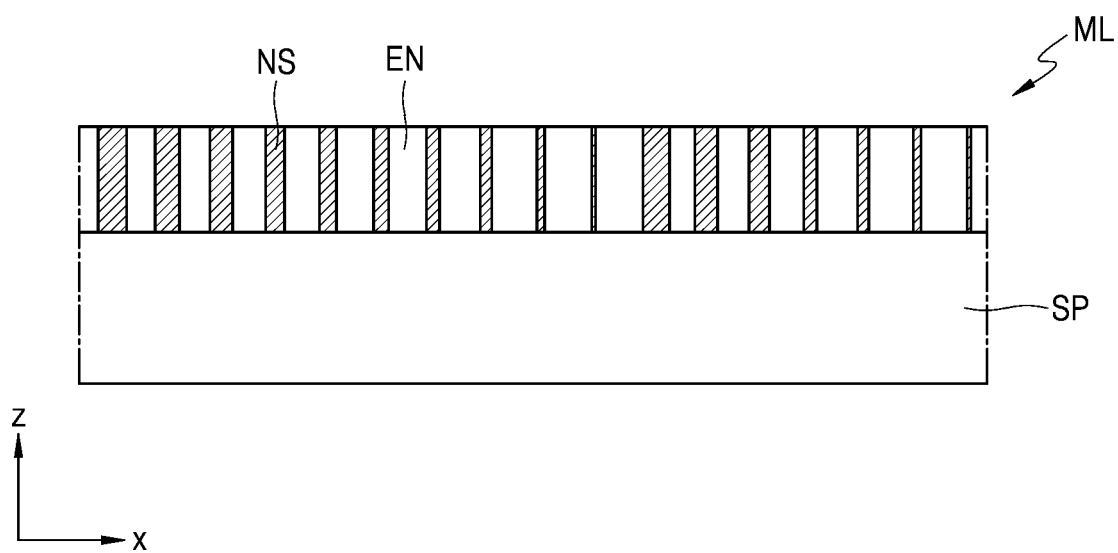
FIGS. 12 and 13 are cross-sectional views of the meta lens of FIG. 11.
Figure 13:
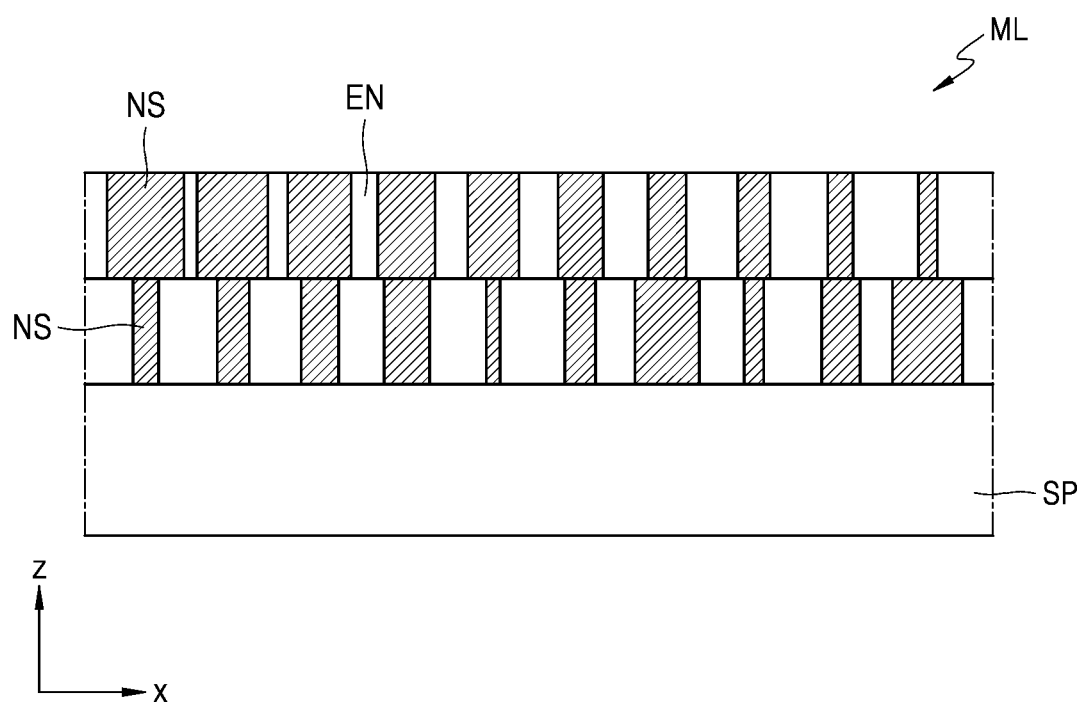

FIGS. 12 and 13 are cross-sectional views taken along line AA of the meta lens ML of FIG. 11.

The meta lens ML may include the support layer SP and the nanostructures NS disposed on the support layer SP. A peripheral material layer EN including a material having a refractive index different from the nanostructure NS may be formed between the nanostructures NS. The peripheral material layer EN, unlike the drawings, may be formed at a higher height than the nanostructure NS and cover the nanostructure NS. The nanostructures NS may be arranged in a single layer as shown in FIG. 12, in a dual layer as shown in FIG. 13, or in a multiple layer of three or more layers.

The support layer SP is characteristically transparent with respect to light of the operating wavelength band of the meta lens ML, and may include any one of materials, such as glass (fused silica, BK7, and the like), quartz, polymer (PMMA, SU-8, and the like), and other transparent plastics.

The nanostructure NS may include a material having a refractive index difference from the peripheral material, such as the peripheral material layer EN, the support layer SP, and the like. For example, the nanostructure NS may have a high refractive index, that is for example, a refractive index difference from the peripheral material is 0.2 or more, or a low refractive index, that is for example, a refractive index difference from the peripheral material is 0.2 or more. The refractive index difference may be 0.2 or more, or 0.5 or more.

When the nanostructure NS includes a material having a higher refractive index than the peripheral material, the nanostructure NS may include at least one of c-Si, p-Si, and a-Si III-V compound semiconductors (GaAs, GaP, GaN, GaAs, and the like), SiC, $TiO_2$, and SiN, and the peripheral material of a low refractive index may include a polymer material, such as SU-8, PMMA, and the like, $SiO_2$, or SOG.

When the nanostructure NS includes a material having a refractive index lower than that of the peripheral material, the nanostructure NS may include $SiO_2$ or air, the peripheral material having a high refractive index may include at least one of c-Si, p-Si, and a-Si Ill-V compound semiconductors (GaAs, GaP, GaN, GaAs, and the like), SiC, $TiO_2$, and SiN.

The nanostructure NS may have a shape dimension less than the operating wavelength of the see-through type display apparatus 1000, for example, the minimum wavelength $\lambda_m$ of the image light formed by the image projector 100. For example, the arrangement interval between the adjacent nanostructures NS may be ½ or more and ⅔ or less of the minimum wavelength $\lambda_m$. The height of the nanostructure NS may be within a range of $0.5\lambda_m$ to $7\lambda_m$.

The nanostructure NS may have a cylindrical shape, and other various shapes, such as a polygonal column, an oval column, and the like.

In FIGS. 11 to 13, common information about meta lenses to be included in the first lens 600 (601) and the second lens 200 (201) provided in the see-through type display apparatus 1000 according to an embodiment, and the shape and arrangement of nanostructures provided suitable for a refractive power implemented by each meta lens may be set.

Figure 14:
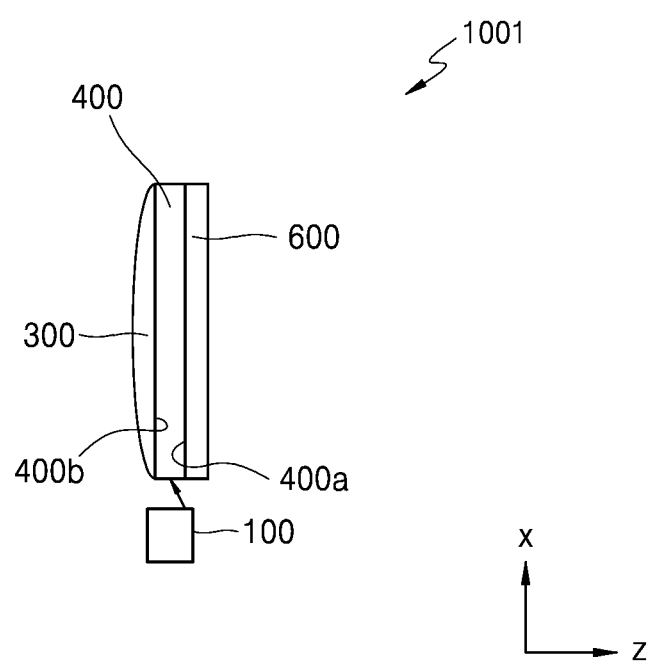
FIG. 14 is a schematic conceptual diagram showing a structure of a see-through type display apparatus according to another embodiment.

FIG. 14 is a schematic conceptual diagram showing the structure of a see-through type display apparatus 1001 according to another embodiment.

The see-through type display apparatus 1001 may include the image projector 100 for outputting the image light L1, the waveguide 400 for transmitting the image light L1 to a user's view, the first lens 600 having a negative refractive power and arranged adjacent to the first surface 400a that is a light exit surface of the waveguide 400, and a second lens 300 having a positive refractive power and arranged adjacent to the second surface 400b facing the first surface 400a.

The see-through type display apparatus 1001 of the present embodiment is different from the see-through type display apparatus 1000 of FIG. 1 in that the second lens 300 is a refractive lens with one curved surface, and the other components are substantially the same.

Figure 15:
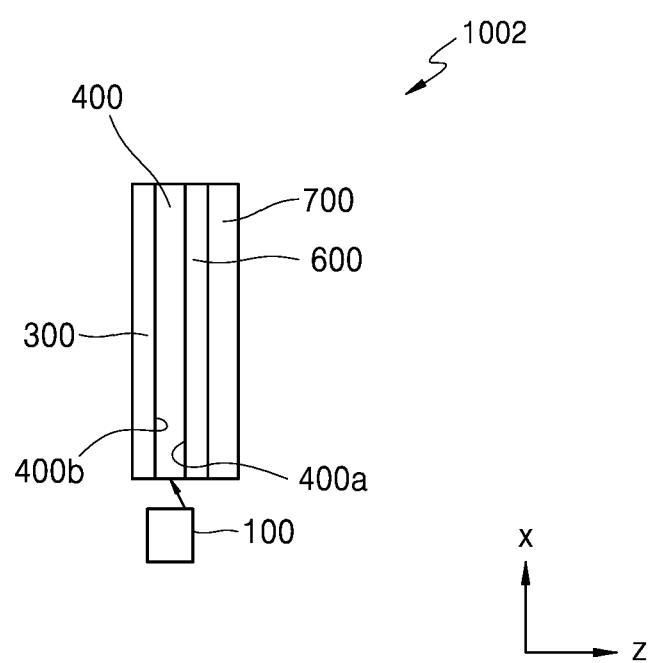
FIG. 15 is a schematic conceptual diagram showing a structure of a see-through type display apparatus according to another embodiment.

FIG. 15 is a schematic conceptual diagram showing the structure of a see-through type display apparatus 1002 according to another embodiment.

The see-through type display apparatus 1002 may include the image projector 100 for outputting the image light L1, the waveguide 400 for transmitting the image light L1 to a user's view, the first lens 600 having a negative refractive power and arranged adjacent to the first surface 400a that is a light exit surface of the waveguide 400, and a second lens 300 having a positive refractive power and arranged adjacent to the second surface 400b facing the first surface 400a.

The see-through type display apparatus 1002 is different from the see-through type display apparatus 1000 of FIG. 1 in further including a vision correction lens 700 arranged adjacent to the first lens 600, and the other components are substantially the same.

The vision correction lens 700 may be detachable with respect to the see-through type display apparatus 1002, for example, with respect to the first lens 600. The vision correction lens 700 may be the meta lens ML described above.

The vision correction lens 700 may have a refractive power suitable for a user's vision, and may be assembled to the first lens 600 according to a user's selection. In other words, the see-through type display apparatus 1002 of the present embodiment may include the see-through type display apparatus 1000 of FIG. 1 and a plurality of types of vision correction lenses 700 which can be assembled thereto, and one of the plurality of types of vision correction lenses 700 is selected by a user and assembled to the first lens 600.

The see-through type display apparatuses described above may be applied to various types of electronic devices. The see-through type display apparatus described above may be applied to, for example, an augmented reality (AR) device, a multi-image display apparatus, or a head-up display apparatus for vehicles.

Figure 16:
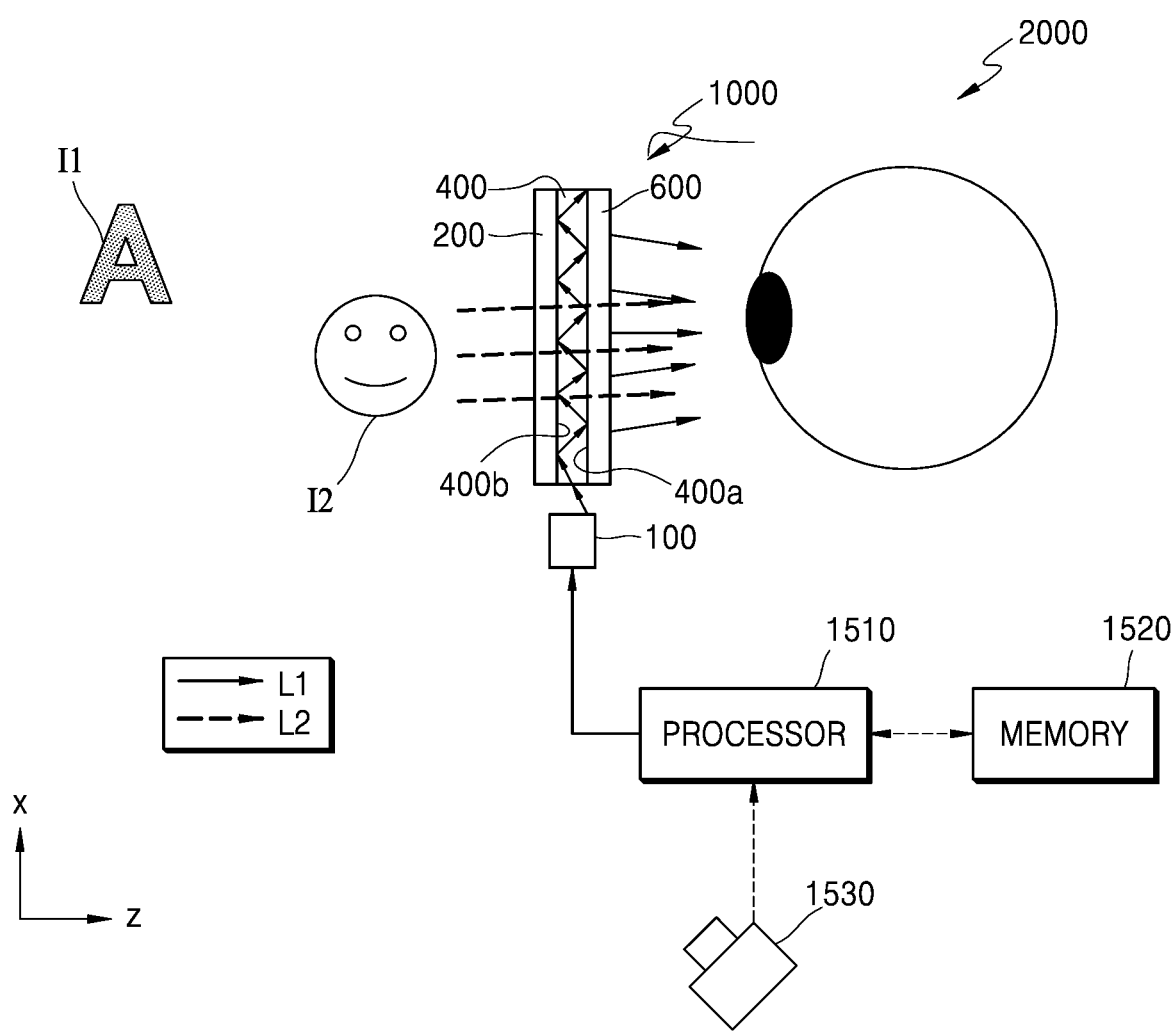
FIG. 16 is a schematic conceptual view showing a structure of an augmented reality device according to an embodiment.

FIG. 16 is a schematic conceptual view showing the structure of an AR device 2000 according to an embodiment.

The AR device 2000 may include the see-through type display apparatus 1000 for providing the image light L1 and a processor 1510 for controlling the see-through type display apparatus 1000 to output an additional image suitable for an environment that a user views. The AR device 2000 may further include a memory 1520 for storing code, other data, and the like of programs to be executed by the processor 1510, and a sensor 1530 for recognizing a user environment.

The AR device 2000 is a display apparatus that combines and displays a virtual object or information on a real world environment, thereby further increasing the effect of reality. For example, at the location of a viewer, additional information about an environment that the real world provides is formed on the image projector 100 and provided to the viewer. An AR display may be applied to a ubiquitous environment worn or an Internet of things (IoT) environment.

A real world image is not limited to a real environment, and may be, for example, an image formed by other image apparatuses. In this case, the AR device 2000 may be referred to as a multi-image display apparatus for displaying two images together.

Although the AR device 2000 is configured as an optical system provided for a single eye, the disclosure is not limited thereto, and the AR device 2000 may be implemented as an optical system separately provided for both eyes.

The AR device 2000 combines the image light L1 with the ambient light L2 and transmits the combined light to a vision of a viewer. In this case, the see-through type display apparatus 1000 may be controlled by the processor 1510 such that the image light L1 includes added information suitable for a user environment. For example, the sensor 1530 recognizes a user environment, and considering a result of the recognition, an added information image suitable therefor may be formed by the image projector 100 of the see-through type display apparatus 1000.

Although the see-through type display apparatus 1000 provided in the AR device 2000 is illustrated as the see-through type display apparatus 1000 of FIG. 1, the disclosure is not limited thereto, and the see-through type display apparatus 1001 (1002) according to another embodiment, or a display apparatus modified therefrom may be employed.

The see-through type display apparatuses described above may be configured in a wearable form. All or some of the constituent elements of the see-through type display apparatuses may be configured in a wearable form.

Figure 17:
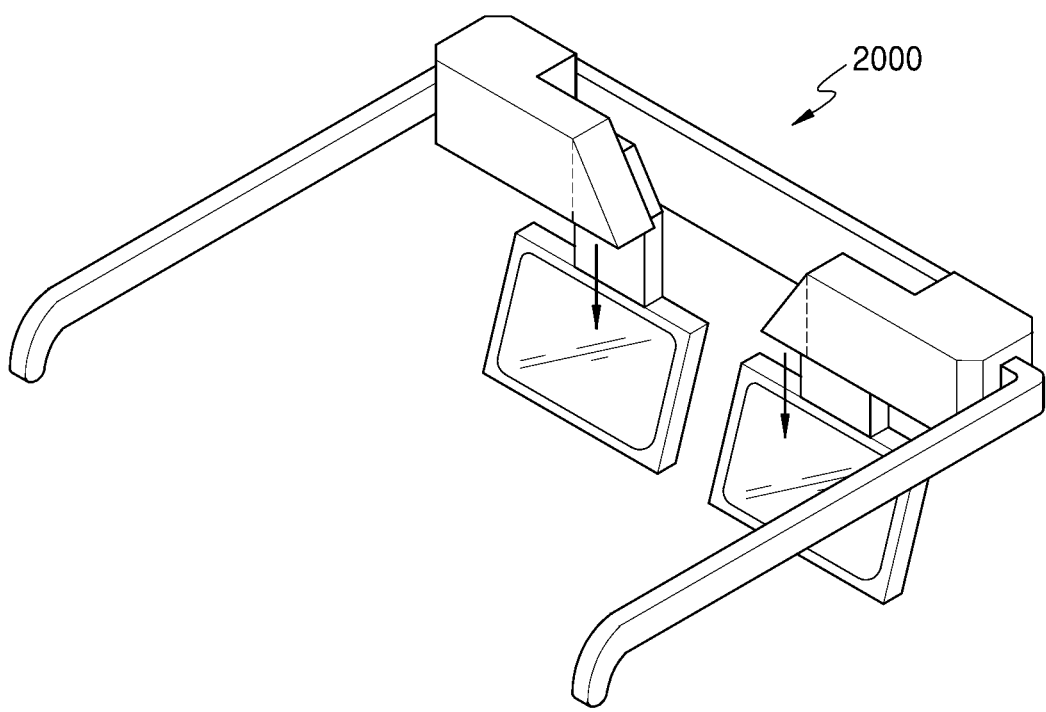
FIGS. 17 and 18 illustrate an appearance of various electronic devices employing a see-through type display apparatus according to an embodiment.
Figure 18:
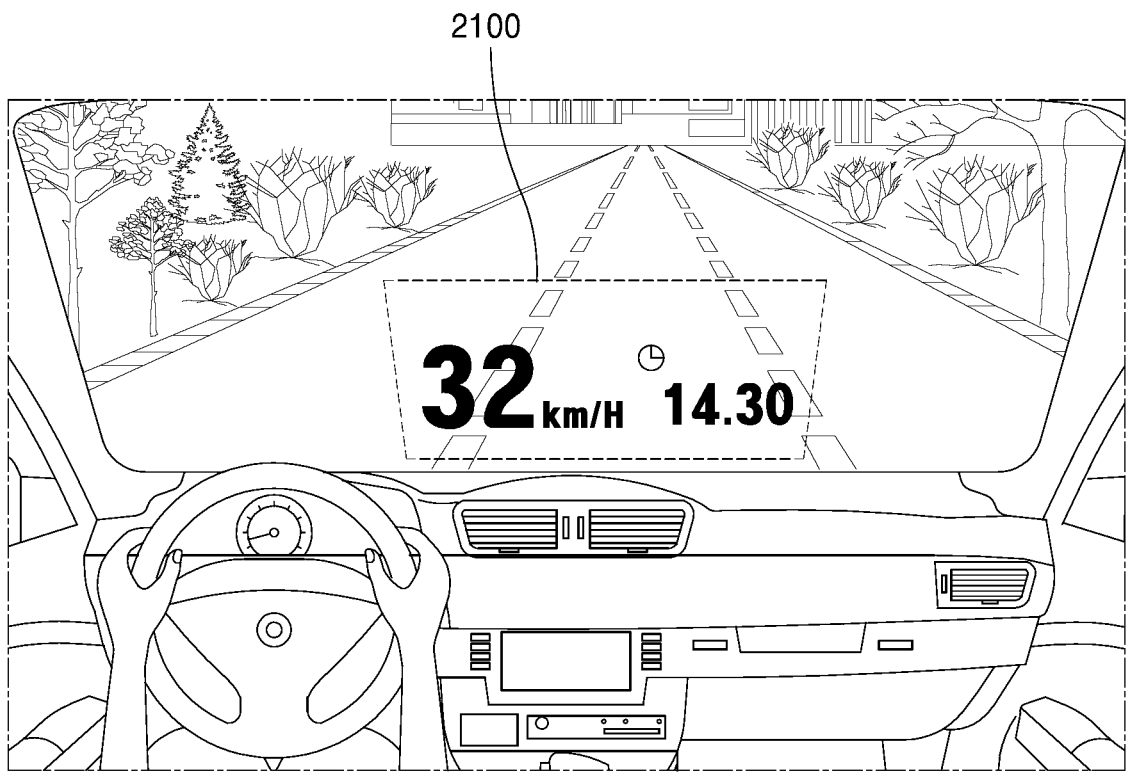

FIGS. 17 and 18 illustrate the appearance of various electronic devices employing a see-through type display apparatus according to an embodiment.

FIG. 17 illustrates the appearance of an electronic device, for example, an AR device, employing a see-through type display apparatus according to an embodiment. As illustrated in FIG. 17, the see-through type display apparatus, as an eye-wearable device, may be applied to a glasses-type display. However, the disclosure is not limited thereto, and the see-through type display apparatus may be applied to a head mounted display (HMD), a goggle-type display, and the like, and may have a form like a contact lens that is directly worn on an eyeball.

A glasses type AR device 2000 of FIG. 17 may be operated in association with an electronic device, such as a smartphone, and may provide virtual reality (VR), AR, or mixed reality (MR).

The see-through type display apparatus according to an embodiment may be applied, as illustrated in FIG. 18, to a head-up display (HUD) 2100 for vehicles.

Figure 19:
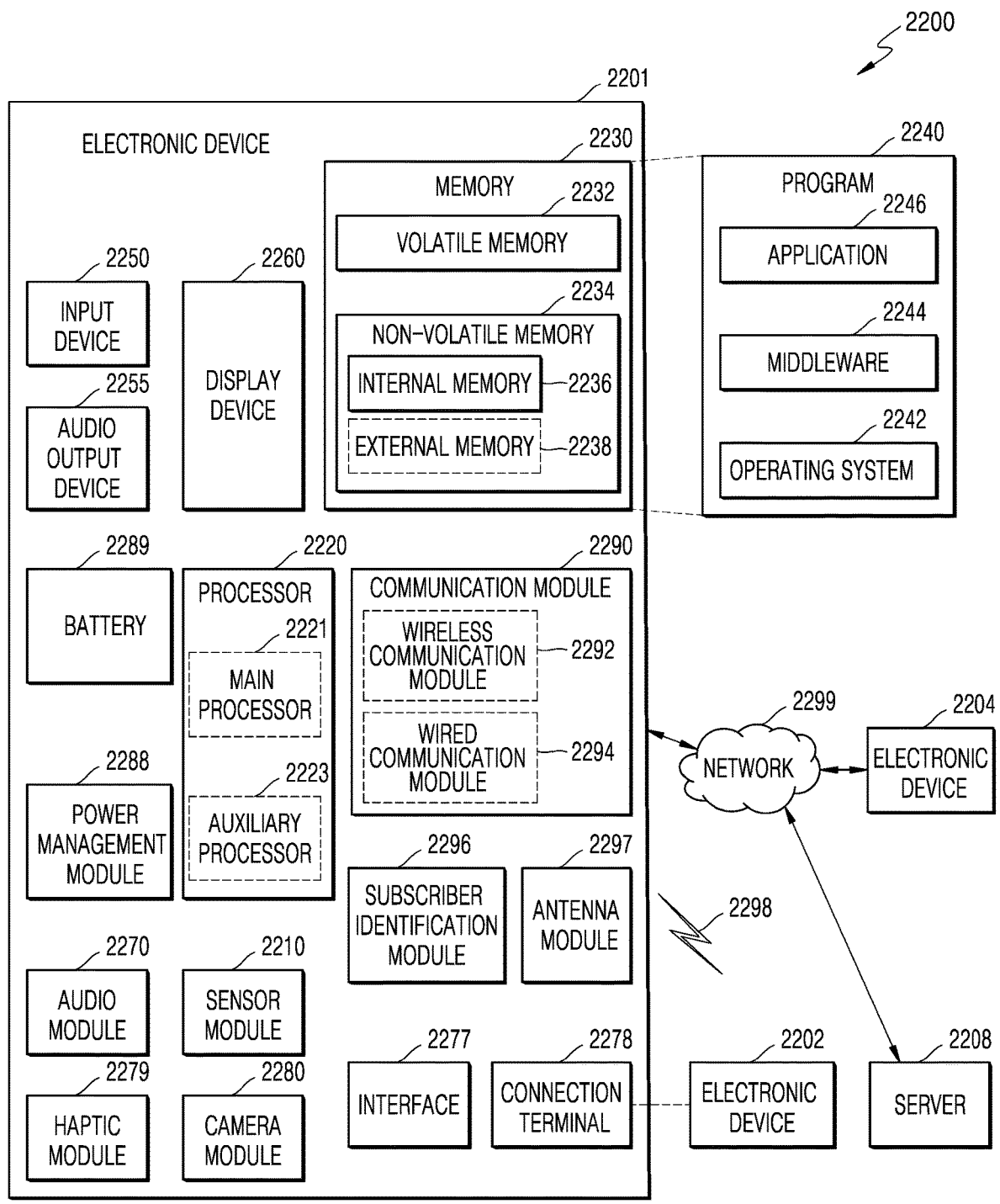
FIG. 19 is a block diagram of an electronic device according to an embodiment.

FIG. 19 is a block diagram of an electronic device according to an embodiment.

Referring to FIG. 19, in a network environment 2200, the electronic device 2201 may communicate with another electronic device 2202 through a first network 2298 (a short-range wireless communication network and the like), or another electronic device 2204 and/or a server 2208 through a second network 2299 (a long-range wireless communication network and the like). The electronic device 2201 may communicate with the electronic device 2204 through the server 2208. The electronic device 2201 may include a processor 2220, a memory 2230, an input device 2250, an audio output device 2255, a display device 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. In the electronic device 2201, some of the constituent elements may be omitted or another constituent element may be added. Some of these constituent elements may be implemented as one integrated circuit. For example, a fingerprint sensor, an iris sensor, an illuminance sensor, and the like of the sensor module 2210 may be implemented by being embedded in the display device 2260 (a display and the like).

The processor 2220 may control, by executing software (a program 2240 and the like), one or a plurality of other constituent elements (a hardware or software constituent element and the like) of the electronic device 2201 connected to the processor 2220, and perform various data processing or operations. As part of data processing or operations, the processor 2220 may load commands and/or data received from other constituent elements (the sensor module 2210, the communication module 2290, and the like) in a volatile memory 2232, process the command and/or data stored in the volatile memory 2232, and store resultant data in a non-volatile memory 2234. The processor 2220 may include a main processor 2221 (a central processing unit, an application processor, and the like) and an auxiliary processor 2223 (a graphics processing unit, an image signal processor, a sensor hub processor, a communication processor, and the like), which are operable independently or together. The auxiliary processor 2223 may consume less power than the main processor 2221 and may perform a specialized function.

The auxiliary processor 2223 may control functions and/or states related to some constituent elements (the display device 2260, the sensor module 2210, the communication module 2290, and the like) of the electronic device 2201, instead of the main processor 2221 when the main processor 2221 is in an inactive state (a sleep state), or with the main processor 2221 when the main processor 2221 is in an active state (an application execution state). The auxiliary processor 2223 (an image signal processor, a communication processor, and the like) may be implemented as a part of functionally related other constituent elements (the camera module 2280, the communication module 2290, and the like).

The memory 2230 may store various pieces of data needed for constituent element (the processor 2220, the sensor module 2210, and the like) of the electronic device 2201. The data may include, for example, software (the program 2240 and the like) and input data and/or output data regarding commands related thereto. The memory 2230 may include the volatile memory 2232 and/or the non-volatile memory 2234.

The program 2240 may be stored as software in the memory 2230, and may include an operating system 2242, a middleware 2244, and/or an application 2246.

The input device 2250 may receive commands and/or data to be used in the constituent elements (the processor 2220 and the like) of the electronic device 2201, from the outside (a user and the like) of the electronic device 2201. The input device 2250 may include a microphone, a mouse, a keyboard, and/or a digital pen (a stylus pen and the like).

The audio output device 2255 may output an audio signal to the outside of the electronic device 2201. The audio output device 2255 may include a speaker and/or a receiver. The speaker may be used for general purposes such as multimedia playback or recording playback, and the receiver may be used to receive incoming calls. The receiver may be combined as a part of the speaker or implemented as an independent separate device.

The display device 2260 may visually provide information to the outside of the electronic device 2201. The display device 2260 may include a display, a hologram device, or a projector, and a control circuit for controlling such a device. The display device 2260 may include a touch circuitry set to sense a touch, and/or a sensor circuit (a pressure sensor and the like) set to measure the strength of a force generated by the touch. The display device 2260 may include a plurality of display devices. One of the display devices 2260 may include any one of the see-through type display apparatuses 1000, 1001, and 1002 or a see-through type display apparatus having a structure modified therefrom. The see-through type display apparatus provided as a part of the display device 2260 may have a configuration that is physically separated from the main body of the electronic device 2201, and may have a shape such as a glasses-type apparatus.

The audio module 2270 may convert sound into an electrical signal or reversely an electrical signal into sound. The audio module 2270 may obtain sound through the input device 2250, or output sound through the audio output device 2255 and/or a speaker and/or a headphone of another electronic device (the electronic device 2202 and the like) connected to the electronic device 2201 in a wired or wireless manner.

The sensor module 2210 may sense an operation state (power, a temperature, and the like) of the electronic device 2201, or an external environment state (a user state and the like), and generate an electrical signal and/or data value corresponding to a sensed state. The sensor module 2210 may include a fingerprint sensor, an acceleration sensor, a position sensor, a 3D sensor, and the like, and further include an iris sensor, a gyro sensor, a barometric pressure sensor, a magnetic sensor, a grip sensor, a proximity sensor, a color sensor, an infrared (IR) sensor, a biometric sensor, a temperature sensor, a humidity sensor, and/or an illuminance sensor.

The interface 2277 may support one or more designated protocols to be used for connecting the electronic device 2201 to another electronic device (the electronic device 2202 and the like) in a wired or wireless manner. The interface 2277 may include a high definition multimedia interface (HDMI), a universal serial bus (USB) interface, an SD card interface, and/or an audio interface.

A connection terminal 2278 may include a connector for physically connecting the electronic device 2201 to another electronic device (the electronic device 2202 and the like). The connection terminal 2278 may include an HDMI connector, a USB connector, an SD card connector, and/or an audio connector (a headphone connector and the like).

The haptic module 2279 may convert electrical signals into mechanical stimuli (vibrations, movements, and the like) or electrical stimuli that are perceivable by a user through tactile or motor sensations. The haptic module 2279 may include a motor, a piezoelectric device, and/or an electrical stimulation device.

The camera module 2280 may capture a still image and a video. The camera module 2280 may include a lens assembly including one or a plurality of lenses, image sensors, image signal processors, and/or flashes.

The application 2246 may include one or more applications executed in association with the display device 2260. The application 2246 may allow added information suitable for a user environment to be display on the display device 2260. For example, the camera module 2280 may be used as a sensor for recognizing a user environment, and necessary added information may be displayed on the display device 2260 according to a result of the recognition.

The power management module 2288 may manage power supplied to the electronic device 2201. The power management module 2288 may be implemented as a part of a power management integrated circuit (PMIC).

The battery 2289 may supply power to the constituent elements of the electronic device 2201. The battery 2289 may include non-rechargeable primary cells, rechargeable secondary cells, and/or fuel cells.

The communication module 2290 may establish a direct (wired) communication channel and/or a wireless communication channel between the electronic device 2201 and another electronic device (the electronic device 2202, the electronic device 2204, the server 2208, and the like), and support a communication through an established communication channel. The communication module 2290 may be operated independently of the processor 2220 (the application processor and the like), and may include one or a plurality of communication processors supporting a wired communication and/or a wireless communication. The communication module 2290 may include a wireless communication module 2292 (a cellular communication module, a short-range wireless communication module, a global navigation satellite system (GNSS) communication module, and the like), and/or a wired communication module 2294 (a local area network (LAN) communication module, a power line communication module, and the like). Among the above communication modules, a corresponding communication module may communicate with another electronic device through the first network 2298 (a short-range communication network such as Bluetooth, WiFi Direct, or infrared data association (IrDA)) or the second network 2299 (a long-range communication network such as a cellular network, the Internet, or a computer network (LAN, WAN, and the like)). These various types of communication modules may be integrated into one constituent element (a single chip and the like), or may be implemented as a plurality of separate constituent elements (multiple chips). The wireless communication module 2292 may verify and authenticate the electronic device 2201 in a communication network such as the first network 2298 and/or the second network 2299 by using subscriber information (an international mobile subscriber identifier (IMSI) and the like) stored in the subscriber identification module 2296.

The antenna module 2297 may transmit signals and/or power to the outside (another electronic device and the like) or receive signals and/or power from the outside. An antenna may include an emitter formed in a conductive pattern on a substrate (a printed circuit board (PCB) and the like). The antenna module 2297 may include one or a plurality of antennas. When the antenna module 2297 includes a plurality of antennas, the communication module 2290 may select, from among the antennas, an appropriate antenna for a communication method used in a communication network such as the first network 2298 and/or the second network 2299. Signals and/or power may be transmitted or received between the communication module 2290 and another electronic device through the selected antenna. Other parts (an RFIC and the like) than the antenna may be included as a part of the antenna module 2297.

Some of the constituent elements may be connected to each other through a communication method between peripheral devices (a bus, general purpose input and output (GPIO), a serial peripheral interface (SPI), a mobile industry processor interface (MIPI), and the like) and may mutually exchange signals (commands, data, and the like).

The command or data may be transmitted or received between the electronic device 2201 and the external electronic device 2204 through the server 2208 connected to the second network 2299. The electronic devices 2202 and 2204 may be of a type that is the same as or different from the electronic device 2201. All or a part of operations executed in the electronic device 2201 may be executed in one or a plurality of the electronic devices 2202 and 2204 and the server 2208. For example, when the electronic device 2201 needs to perform a function or service, the electronic device 2201 may request one or a plurality of electronic devices to perform part of the whole of the function or service, instead of performing the function or service. The one or a plurality of the electronic devices receiving the request may perform additional function or service related to the request, and transmit a result of the performance to the electronic device 2201. To this end, cloud computing, distributed computing, and/or client-server computing technology may be used.

It should be understood that the see-through type display apparatus and the electronic device including the same described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

The see-through type display apparatus described above may implement a thin optical system having almost no chromatic aberration, based on the waveguide and the meta lens.

The see-through type display apparatus described above has a structure that is easy to be applied to a wearable device, and may be applied to various electronic devices, such as an AR device and the like.

One skilled in the art would understand that various modifications of the exemplary embodiments would fall within the scope and spirit of this disclosure, as described by the claims and their equivalents.

What is claimed is:

1. A see-through type display apparatus comprising:
    an image projector configured to output image light;
    a waveguide configured to receive the image light output from the image projector and transmit the image light to a user's view, the waveguide comprising a first surface through which the image light is output and a second surface opposite the first surface;
    a first lens disposed on the first surface of the waveguide, the first lens having a negative refractive power, and comprising one or more meta lenses; and
    a second lens disposed on the second surface of the waveguide, and the second lens having a positive refractive power,
    the first lens including a first meta lens disposed on the first surface of the waveguide, the first meta lens having a first refractive power; and
    a second meta lens disposed on the first surface and spaced apart from the first meta lens by a first distance, the second meta lens having a second refractive power opposite to the first refractive power.

2. The see-through type display apparatus of claim 1, wherein the first meta lens has a negative refractive power; and
the second meta lens has a positive refractive power; and the first lens further includes:
a third meta lens spaced apart from the second meta lens by a second distance, the third meta lens having a negative refractive power.

3. The see-through type display apparatus of claim 2, wherein the first lens further comprises:
a first spacer disposed between the first meta lens and the second meta lens, the first spacer having a thickness corresponding to the first distance; and
a second spacer disposed between the second meta lens and the third meta lens, the second spacer having a thickness corresponding to the second distance.

4. The see-through type display apparatus of claim 3, wherein the first spacer and the second spacer have a same refractive index and a same thickness.

5. The see-through type display apparatus of claim 1, wherein the first meta lens has a positive refractive power; and
the second meta lens has a negative refractive power; and the first lens further includes:
a third meta lens spaced apart from the second meta lens by a second distance, the third meta lens having a positive refractive power.

6. The see-through type display apparatus of claim 1, wherein one surface of the second lens is a convex refractive lens.

7. The see-through type display apparatus of claim 1, wherein the second lens comprises one or more meta lenses.

8. The see-through type display apparatus of claim 7, wherein the second lens comprises:
a first meta lens having a positive refractive power;
a second meta lens spaced apart from the first meta lens by a first distance, the second meta lens having a negative refractive power; and
a third meta lens spaced apart from the second meta lens by a second distance, the third meta lens having a positive refractive power.

9. The see-through type display apparatus of claim 8, wherein the second lens further comprises:
a first spacer disposed between the first meta lens and the second meta lens, the first spacer having a thickness corresponding to the first distance; and
a second spacer disposed between the second meta lens and the third meta lens, the second spacer having a thickness corresponding to the second distance.

10. The see-through type display apparatus of claim 9, wherein the first spacer and the second spacer have a same refractive index and a same thickness.

11. The see-through type display apparatus of claim 10, wherein the first distance and the second distance are $d_{min}$ or more, $d_{min}$ being represented by the equation below, where f is a focal length of the second lens, D is an effective diameter of the second lens, $n_g$ is a refractive index of the first spacer and the second spacer, and $\theta_{max}$ is a maximum deflection angle of incident light by the first meta lens:

$$d_{min} = \frac{\sqrt{f^2 + \frac{D^2}{4}} - f}{2n_g} \frac{\cos\theta_{max}}{1 - \cos\theta_{max}}.$$

12. The see-through type display apparatus of claim 10, wherein the second lens further comprises a blocking member configured to block light incident on the second lens from passing through a center of the second meta lens.

13. The see-through type display apparatus of claim 12, wherein the blocking member is disposed in a central portion of the first meta lens.

14. The see-through type display apparatus of claim 12, wherein the blocking member is disposed in a central portion of the second meta lens.

15. The see-through type display apparatus of claim 14, wherein the blocking member has a diameter of $Do_{min}$ or more, $DO_{min}$ being represented by the equation below, where f is a focal length of the second lens, D is an effective diameter of the second lens, $n_g$ is a refractive index of the first spacer and the second spacer, and $\theta_{max}$ is a maximum deflection angle of incident light by the first meta lens:

$$D_{o_{min}} = \frac{\sqrt{f^2 + \frac{D^2}{4}} - f}{n_g} \frac{\sin\theta_{max}}{1 - \cos\theta_{max}} = \frac{\sqrt{f^2 + \frac{D^2}{4}} - f}{n_g} \cot\frac{\theta_{max}}{2}.$$

16. The see-through type display apparatus of claim 1, wherein an absolute value of the negative refractive power of the first lens is different from an absolute value of the positive refractive power of the second lens.

17. The see-through type display apparatus of claim 1, further comprising a vision correction lens detachably disposed adjacent to the first lens.

18. The see-through type display apparatus of claim 17, wherein the vision correction lens comprises a meta lens.

19. An electronic device comprising:
a see-through type display apparatus; and
a processor configured to control the see-through type display apparatus to output an additional image that a user views,
wherein the see-through type display apparatus comprises:
an image projector configured to output image light;
a waveguide configured to receive the image light output from the image projector and transmit the image light to a user's view, the waveguide comprising a first surface through which the image light is output and a second surface opposite the first surface;
a first lens disposed on the first surface of the waveguide, the first lens having a negative refractive power and comprising one or more meta lenses; and
a second lens disposed on the second surface of the waveguide, the second lens and having a positive refractive power,
the first lens including:
a first meta lens disposed on the first surface of the waveguide, the first meta lens having a first refractive power; and
a second meta lens disposed on the first surface and spaced apart from the first meta lens by a first distance, the second meta lens having a refractive power opposite to the first meta lens.

20. The electronic device of claim 19, wherein the see-through type display apparatus comprises an eye-wearable device.

* * * * *